United States Patent [19]
Matheny et al.

[11] Patent Number: 5,550,563
[45] Date of Patent: Aug. 27, 1996

[54] INTERACTION FRAMEWORK SYSTEM

[75] Inventors: John R. Matheny; Christopher White, both of Mountain View, Calif.

[73] Assignee: Taligent, Inc., Cupertino, Calif.

[21] Appl. No.: 996,073

[22] Filed: Dec. 23, 1992

[51] Int. Cl.$^6$ ........................................ G09G 5/00
[52] U.S. Cl. ...................... 345/168; 345/145; 345/146; 345/157; 395/159
[58] Field of Search ........................... 345/145, 146, 345/157, 163, 162, 160, 168; 395/155, 156, 157, 159

[56] References Cited

U.S. PATENT DOCUMENTS

| | | | |
|---|---|---|---|
| 3,658,427 | 4/1972 | Decou | 356/156 |
| 3,881,605 | 5/1975 | Grossman | 214/1 CM |
| 4,082,188 | 4/1978 | Grimmell et al. | 209/73 |
| 4,635,208 | 1/1987 | Coleby et al. | 364/491 |
| 4,677,576 | 6/1987 | Berlin, Jr. et al. | 364/522 |
| 4,704,694 | 11/1987 | Czerniejewski | 364/513 |
| 4,742,356 | 5/1988 | Kuipers | 342/448 |
| 4,760,386 | 7/1988 | Heath et al. | 345/163 |
| 4,821,220 | 4/1989 | Duisberg | 364/578 |
| 4,885,717 | 12/1989 | Beck et al. | 364/900 |
| 4,891,630 | 1/1990 | Friedman et al. | 340/706 |
| 4,939,648 | 7/1990 | O'Neill et al. | 364/422 |
| 4,953,080 | 8/1990 | Dysart et al. | 364/200 |
| 5,041,992 | 8/1991 | Cunnigham et al. | 364/518 |
| 5,050,090 | 9/1991 | Golub et al. | 364/478 |
| 5,060,276 | 10/1991 | Morris et al. | 382/8 |
| 5,075,848 | 12/1991 | Lai et al. | 395/425 |
| 5,093,914 | 3/1992 | Coplien et al. | 395/700 |
| 5,119,475 | 6/1992 | Smith et al. | 395/156 |
| 5,125,091 | 6/1992 | Staas, Jr. et al. | 395/650 |
| 5,133,075 | 7/1992 | Risch | 395/800 |
| 5,136,705 | 8/1992 | Stubbs et al. | 395/575 |
| 5,151,987 | 9/1992 | Abraham et al. | 395/575 |
| 5,168,441 | 12/1992 | Onarheim et al. | 364/146 |
| 5,177,685 | 1/1993 | Davis et al. | 364/443 |
| 5,181,162 | 1/1993 | Smith et al. | 364/419 |
| 5,198,802 | 3/1993 | Bertram et al. | 345/163 |
| 5,239,287 | 8/1993 | Siio et al. | 345/163 |
| 5,327,529 | 7/1994 | Fults | 395/155 |

FOREIGN PATENT DOCUMENTS 0352908 1/1990 European Pat. Off. .
0506102 9/1992 European Pat. Off. .

OTHER PUBLICATIONS

0/S/2 Version 2.0, V.3::"Presentation Manager and Workplace Shell" Apr. 1992, IBM Corporation International Technical Support Center, Voca Raton, FL, p. 53.
IBM Technical Disclosure Bulletin, V. 35, N. 4B, Sep 1992, Armonk NY, pp. 227–232, "Dynamic Icon Presentation".
IBM Technical Disclosure Bulletin, V.33, N. 11, Apr. 1991, Armonk NY, p. 312 "Auto Scroll During Direct Manipulation".
OS/2 Technical Library Presentation Manager Programming Reference, V.III Mar. 1992, IBM Corporation, Armond NY.

*Primary Examiner*—Richard Hjerpe
*Assistant Examiner*—Xiao M. Wu

[57] ABSTRACT

A method and apparatus for an innovative object oriented system. The sequence of events corresponding to a user pressing, moving, and releasing the mouse is called the input syntax. Certain sequences of events are used to indicate particular actions, called semantic operations. This invention discloses the method and apparatus for translating input syntax into semantic operations for an object that supports Select, Peek, Move, AutoScroll, and Drag/Drop (Copy).

20 Claims, 15 Drawing Sheets

INTERACTION FRAMEWORK SYSTEM

FIELD OF THE INVENTION

This invention generally relates to improvements in display systems and more particularly to improving an object oriented operating system's interaction framework system.

BACKGROUND OF THE INVENTION

Among developers of workstation software, it is increasingly important to provide a flexible software environment while maintaining consistency in the user's interface. An early attempt at providing this type of an operating environment is disclosed in U.S. Pat. No. 4,686,522 to Hernandez et al. This patent discusses a combined graphic and text processing system in which a user can invoke a dynamic menu at the location of the cursor and invoke any of a variety of functions from the menu. This type of natural interaction with a user improves the user interface and makes the application much more intuitive.

Object oriented applications should also reflect a consistent interaction interface with the user regardless of what application is currently active. None of the prior art references applicant is aware of provides the innovative hardware and software system features which enable all application object oriented applications to function in a consistent manner.

SUMMARY OF THE INVENTION

Accordingly, it is a primary objective of the present invention to provide an innovative object oriented application interface. Users of an object oriented operating system's graphical user interface often move a mouse, click on objects to select them, drag objects to move or copy them, and double-click to open an object. These operations are called direct manipulations, or interactions. The sequence of events corresponding to a user pressing, moving, and releasing the mouse is called the input syntax. Certain sequences of events are used to indicate particular actions, called semantic operations. This invention discloses the method and apparatus for translating input syntax into semantic operations for an object that supports Select, Peek, Move, AutoScroll, and Drag/Drop (Copy).

The invention detects a mouse button depression and then employs the following logic:

(a) If an Option key was depressed when the user pressed the mouse button, the system enters drag mode by setting variable fInteractionType to constant kDrag. The system then commences a drag operation using the selected object as the target of the operation; or (b) if the Option key was not depressed, then the system enters selection mode by setting variable fInteraction Type to constant kSelect. Then, the select operation is commenced.

If a user already had the mouse button depressed and continues to hold the mouse button down, then the following logic is engaged. If the system is in select mode, then the system first determines whether the user has moved the mouse beyond a certain threshold, called the move threshold. This is done by comparing the initial mouse location, returned by the GetInitialLocation method, with the current mouse location, returned by the GetCurrentLocation method. If the mouse has moved beyond the move threshold, the system ends select mode and enters move mode. It does this by setting variable fInteractionType to constant kMove. The system then tells the object to terminate the select operation by calling its SelectEnd method. The system then initiates a move operation by calling its MoveBegin method.

Otherwise, if the mouse has not moved, the system checks how long the mouse has been down. It does this by comparing the initial mouse down time, returned by the GetInitialTime method, with the current time, returned by the GetCurrentTime method. If the mouse has been down beyond a certain threshold, called the peek threshold, the system ends select mode and enters peek mode. It does this by setting variable fInteractionType to constant kPeek. It asks the object to end the select operation by callings its SelectEnd method, and begins a peek operation by calling its PeekBegin method. Otherwise, if the mouse has not moved, or it has not been down beyond the peek threshold, the system continues the select operation by calling the object's SelectRepeat method. If the system detects that a user is in Move mode, the system first determines whether the user has moved the mouse within the window, on the border of the window, or outside the window. It does this by comparing the current mouse location, returned by the GetCurrentLocationMethod, with the bounds of the object's container, returned by GetContainerBounds.

If the mouse is still within the bounds of the window, the system continues the move operation by calling the object's MoveRepeat method. If the mouse is on the border of the window, this indicates an AutoScroll operation. The system asks the object's container to scroll in the direction indicated by the mouse location. This is done by calling the container's AutoScroll method and passing the current mouse location as a parameter. Once complete, the system continues the move operation by calling the object's MoveRepeat method.

If the mouse has moved outside the window, the system ends move mode and enters drag mode. It does this by setting variable fInteractionType to constant kDrag. It asks the object to end the move operation by calling its MoveEnd method. It asks the object to begin the drag operation by calling its DragBegin method. If the system is in drag mode, the system continues the drag operation by calling the object's DragRepeat method. If the system is in peek mode, the system first determines whether the user has moved the mouse beyond a certain threshold, called the move threshold. This is done by comparing the initial mouse location, returned by the GetInitialLocation method, with the current mouse location, returned by the GetCurrentLocation method.

If the mouse has moved beyond the move threshold, the system ends peek mode and enters move mode. It does this by setting variable fInteractionType to constant kMove. It asks the object to end the peek operation by calling its PeekEnd method. It asks the object to begin the move operation by calling its MoveBegin method. Otherwise, if the mouse has not moved, the system continues the peek operation by calling the object's PeekRepeat method.

If the system detects that a user releases the mouse button, then if the system is in select mode, the system ends select mode. It does this by setting variable fInteractionType to constant kNone. The system queries the object to end the select operation by calling its SelectEnd method. If the system is in move mode, the system ends move mode. It does this by setting variable fInteractionType to constant kNone. Then, the system queries the object to end the move operation by calling its MoveEnd method and ends drag mode by setting variable fInteractionType to constant kNone. It asks the object to end the drag operation by calling its DragEnd method. If the system is in peek mode, the system ends peek mode. It does this by setting variable fInteractionType to constant kNone. It asks the object to end the peek operation by calling its PeekEnd method.

DETAILED DESCRIPTION OF THE INVENTION

Figure 1A:
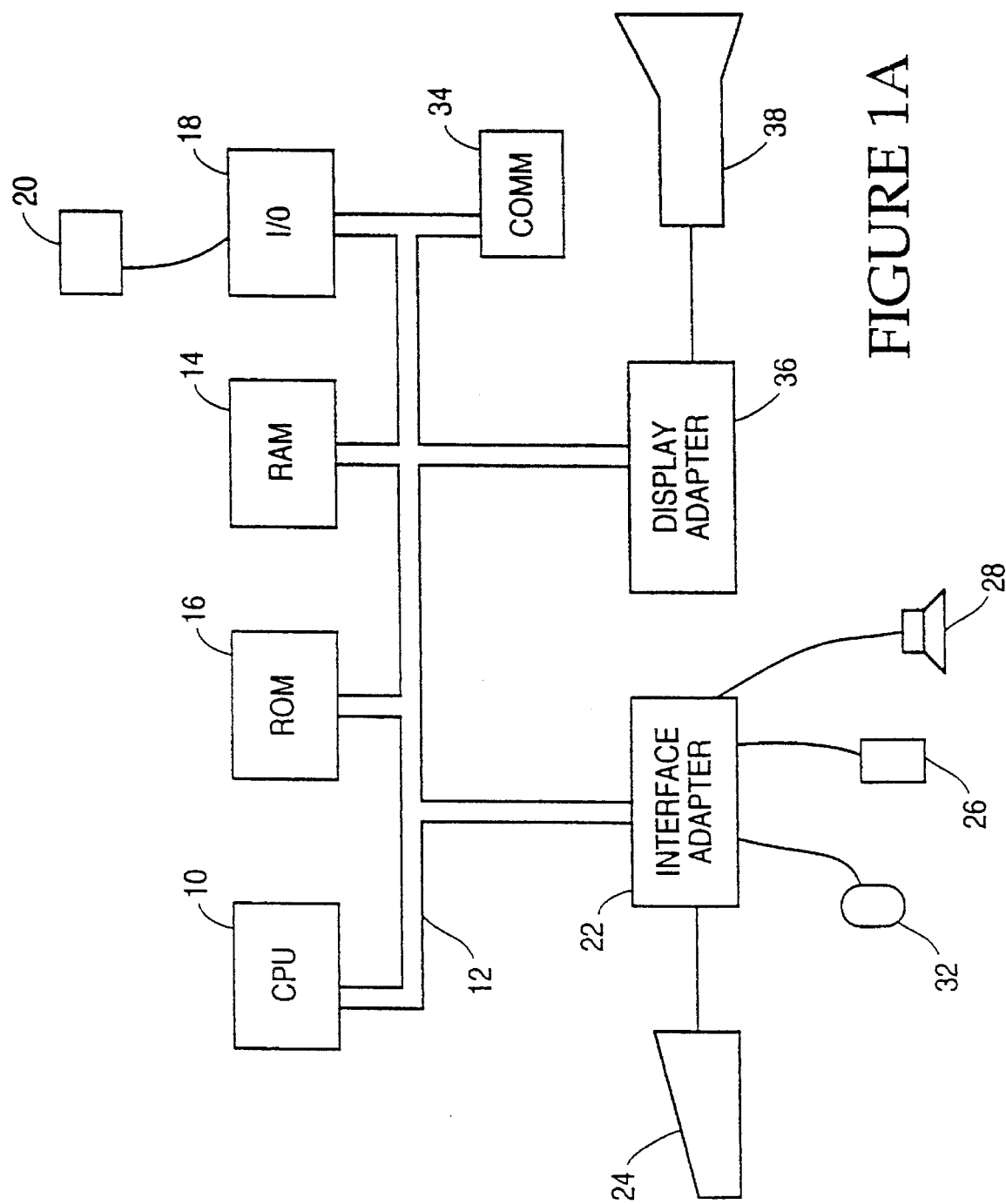
FIG. 1A is a block diagram of a personal computer system in accordance with the subject invention.

The invention is preferably practiced in the context of an operating system resident on a personal computer such as the IBM® PS/2 ® or Apple® Macintosh® computer. A representative hardware environment is depicted in FIG. 1A, which illustrates a typical hardware configuration of a workstation in accordance with the subject invention having a central processing unit 10, such as a conventional microprocessor, and a number of other units interconnected via a system bus 12. The workstation shown in FIG. 1A includes a Random Access Memory (RAM) 14, Read Only Memory (ROM) 16, an I/O adapter 18 for connecting peripheral devices such as disk units 20 to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network and a display adapter 36 for connecting the bus to a display device 38. The workstation has resident thereon an operating system such as the IBM OS/2® operating system or the Apple System/7® operating system.

The subject invention is a new object-oriented system software platform comprised of an operating system and development environment designed to revolutionize personal computing for end-users, developers, and system vendors. The system is a complete, standalone, native operating system and development environment architected from the ground up for high-performance personal computing. The invention is a fully object-oriented system including a wealth of frameworks, class libraries, and a new generation object programming environment, intended to improve fundamentally the economics of third party application software development. The subject invention is a fully portable operating system.

Traditional operating systems provide a set of services which software developers can use to create their software. Their programs are very loosely integrated into the overall operating system environment. For example, DOS applications take over the entire machine. This means that as far as the user is concerned, the application is the operating system. In Macintosh® and Windows operating systems, applications feel and look similar and they typically support cutting and pasting between applications. This commonalty makes it easier for users to use multiple applications in a single environment. However, because the commonalty is not factored into a set of services and frameworks, it is still very difficult to develop software.

In the subject invention, writing an "application" means creating a set of objects that integrate into the operating system environment. Software developers rely on the operating system for both a sophisticated set of services and a framework to develop software. The frameworks in the subject invention provide powerful abstractions which allow software developers to concentrate on their problem rather than on building up infrastructure. Furthermore, the fundamental abstractions for the software developer are very close to the fundamental concepts that a user must understand to operate her software. This architecture results in easier development of sophisticated applications.

This section describes four steps to writing software employing the subject invention. A user contemplating the development of an application is typically concerned with the following questions:

What am I modeling?

For a word processor, this is the text I am entering; for a spreadsheet, it is the values and formulas in the cells.

How is the data presented?

Again, for a word processor, the characters are typically displayed in a what-you-see-is-what-you-get (wysiwyg) format on the screen with appropriate line and page breaks; in a spreadsheet it is displayed as a table or a graph; and in a structured graphics program (e.g. MacDraw), it is displayed as a set of graphics objects.

What can be selected?

In a word processing application, a selection is typically a range of characters; in a structured graphics program it is a set of graphic objects.

What are the commands that can operate on this selection?

Figure 1B:
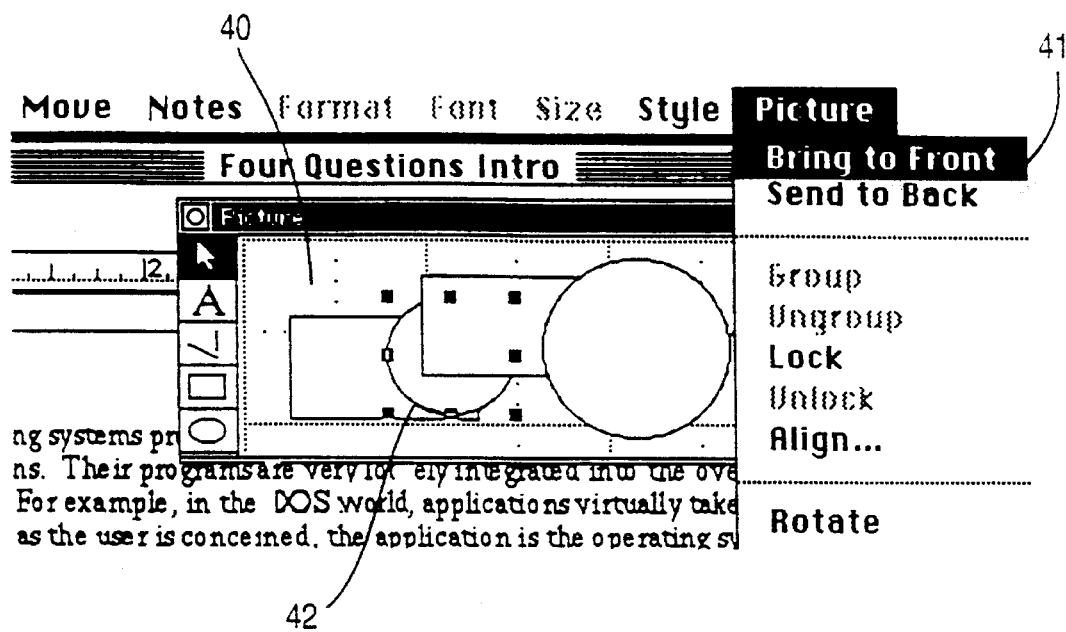
FIG. 1B is a display in accordance with the subject invention.

A command in a word processor might be to change the style of a set of characters to bold. A command in a structured graphic program might be to rotate a graphic object. FIG. 1B is an illustration of a display in accordance with the subject invention. A command is illustrated at 41 for bringing a picture to the front of a display. A presentation of graphic information is illustrated at 40. Finally, a selection of a particular graphic object, a circle, is shown at 42.

A developer must answer the same four questions asked by the user. Fortunately, the subject invention provides frameworks and services for addressing each of these four questions. The first question that must be answered is: What am I modeling? In a word processing program, the data includes the characters that make up a document. The data in a spreadsheet includes the values and formulas in the cells. In a calendar program, the data includes the times and appointments associated with a given day. The invention provides facilities that help to model data. There are classes for modeling specific data types including: text, structured graphics, sound and video. In addition to these specific classes, the invention provides a number of other abstractions that support problem modeling, including: collection classes, concurrency control, recovery framework, and the C++ language. The class that encapsulates the data model for a particular data type provides a specific protocol for accessing and modifying the data contained in the data encapsulator, support for overriding a generic protocol for embedding other data encapsulators and for being embedded in other data encapsulators, generating notification to all registered objects when the data changes, and overriding a generic protocol for creating presentations of the data.

The next question that must be answered is: how is the data presented? In a structured graphic program, the set of graphic objects are typically rendered on a canvas. In a spreadsheet, it is typically a table of cells or a graph; and in a presentation program it is a set of slides or an outline. The subject invention provides a "view" of the data contained in a data encapsulator. The view is created using a "view system" and graphic system calls. However, playing a sound or video clip is also considered a presentation of the data.

Next: what can be selected? In a word processing program, a selection is a range of characters; in a structured graphics program, it is a set of graphics objects; and in a spreadsheet it is a range of cells. The invention provides selection classes for all of the fundamental data types that the system supports. The abstract baseclass that represents a selection made by a user provides an address space independent specification of the data selected. For text, this would be a numeric range of characters rather than a pair of pointers to the characters. This distinction is important because selections are exchanged between other machines when collaborating (in real-time) with other users. The baseclass also overrides a generic protocol for creating a persistent selection corresponding to this selection. Persistent selections are subclasses of an anchor object and may be heavier weight than their corresponding ephemeral selections because persistent selections must survive editing changes. For example, a persistent text selection must adjust itself when text is inserted before or after it. Anchors are used in the implementation of hypermedia linking, dataflow linking and annotations.

The baseclass also provides an override generic protocol for absorbing, embedding and exporting data contained in a data encapsulator. Baseclasses are independent of the user interface technique used to create them. Selections are typically created via direct manipulation by a user (e.g. tracking out a range of text or cells) but can be created via a script or as a result of a command. This orthogonality with the user interface is very important. Baseclasses also provide specific protocol for accessing the data encapsulator. There is a very strong relationship between a particular subclass of the encapsulator class and its subclass of a model selection class.

Finally: what are the commands that can operate on this selection? In a word processing program, a command might change the style of a selected range of characters and in a structured graphics program, a command might rotate a graphic object. The subject invention provides a large number of built-in command objects for all of the built-in data types as well as providing generic commands for Cut, Copy, Paste, Starting HyperMedia Links, Completing Links, Navigating Links, Pushing Data on Links, Pulling Data on Links, as well as many user interface commands. The abstract baseclass that represents a command made by the user is responsible for capturing the semantics of a user action, determining if the command can be done, undone, and redone. Command objects are responsible for encapsulating all of the information necessary to undo a command after a command is done. Before a command is done, command objects are very compact representations of a user action. The baseclass is independent of the user interface technique used to create them. Commands are typically created from menus or via direct manipulation by the user (e.g. moving a graphic object) but could be created via a script. This orthogonality with the user interface is very important.

Benefits Of Frameworks

The benefits of plugging into the abstractions in the invention are greater than providing a conceptual model. Plugging into the framework provides many sophisticated features architected into the base operating system. This means that the framework implements major user features by calling relatively small methods. The result is that an investment in coding for the framework is leveraged over several features.

Multiple Data Types

Once a new kind of data is implemented, the new data type becomes a part of the system. Existing software that can handle data encapsulators can handle your new data type without modification. This differs from current computer systems, such as the Macintosh computer system. For example, a scrapbook desk accessory can store any kind of data, but it can only display data that has a text or quickdraw picture component. In contrast, the subject invention's scrapbook displays any kind of data, because it deals with the data in the form of an object. Any new data type that is created behaves exactly like the system-provided data types. In addition, the data in the scrapbook is editable since an object provides standard protocol for editing data.

The scrapbook example highlights the advantages of data encapsulators. If software is developed such that it can handle data encapsulators, an application can be designed to simply handle a new data type. A new application can display and edit the new kind of data without modification.

Multi-level Undo

The invention is designed to support multi-level undo. Implementing this feature, however, requires no extra effort on the part of a developer. The system simply remembers all the command objects that are created. As long as the corresponding command object exist, a user can undo a particular change to the data. Because the system takes care of saving the commands and deciding which command to undo or redo, a user does not implement an undo procedure.

Document Saving, Reliability, and Versioning

A portion of the data encapsulator protocol deals with filing the data into a stream and recreating the data at another place and/or time. The system uses this protocol to implement document saving. By default, a user's data objects are streamed to a file when saved. When the document is opened, the data objects are recreated. The system uses a data management framework to ensure the data written to disk is in a consistent state. Users tend to save a file often so that their data will be preserved on disk if the system crashes. The subject invention does not require this type of saving, because the system keeps all the command objects. The state of the document can be reconstructed by starting from the last disk version of the document and replaying the command objects since that point in time. For reliability, the system automatically logs command objects to the disk as they occur, so that if the system crashes the user would not lose more than the last command.

The invention also supports document versioning. A user can create a draft from the current state of a document. A draft is an immutable "snapshot" of the document at a particular point in time. (One reason to create a draft is to circulate it to other users for comments.) The system automatically takes care of the details involved with creating a new draft.

Collaboration

As mentioned above, a document can be reconstructed by starting with its state at some past time and applying the sequence of command objects performed since that time. This feature allows users to recover their work in the case of a crash, and it can also be used to support real-time collaboration. Command objects operate on selections, which are address-space independent. Therefore, a selection object can be sent to a collaborator over the network and used on a remote machine. The same is true of command objects. A command performed by one collaborator can be sent to the others and performed on their machines as well. If the collaborators start with identical copies of the data, then their copies will be remain "in sync" as they make changes. Creating a selection is done using a command object, so that all collaborators have the same current selection.

The system uses a feature known as "model based tracking" to perform mouse tracking on each collaborator's machine. The tracker object created to handle a mouse press creates and performs a series of incremental commands as a user moves the mouse. These commands are sent to collaborators and performed by each collaborator. The result is that each collaborator is sees the tracking feedback as it occurs. The system also establishes a collaboration policy. A collaboration policy decides whether users are forced to take turns when changing data or can make changes freely. The invention handles the mechanics of collaboration which removes the responsibility from an application developer.

Scripting

Designing a system to manage the sequence of command objects also makes it possible to implement a systemwide scripting facility. The sequence of command objects is equivalent to a script of the local actions. The scripting feature simply keeps track of command objects applied to any document. The scripting facility also uses selection objects in scripts. This feature provides customization of a script by changing the selection to which the script applies. Since command objects include a protocol for indicating whether they can apply to a particular selection, the system ensures that a user's script changes are valid.

Hypermedia Linking

Persistent selections, also known as anchors, can be connected by link objects. A link object contains references to the two anchors that form its endpoints. To the system, the link is bidirectional; both ends have equal capabilities. Certain higher-level uses of links may impose a direction on the link. The single link object supports two standard features: navigation and data flow. A user can navigate from one end of the link to the other. Normally, this will involve opening the document containing the destination anchor and highlighting the persistent selection. The exact behavior is determined by the anchor object at the destination end. For example, a link to an animation may play the animation. A link to a database query may perform the query.

Links also facilitate data flow. The selected data at one end of the link can be transferred to the other end to replace the selection there. In most cases, the effect is the same as if the user copied the selection at one end, used the link to navigate to the other end, and pasted the data. The system takes care of the details involved with navigating from one end of a link to the other (e.g., locating the destination document, opening it, scrolling the destination anchor into view, etc.). Similarly, the system handles the details of transferring data across the link. The latter is done using the selection's protocol for o accessing and modifying the data to which it refers.

Annotations

The invention supports a system-wide annotation facility. This facility allows an author to distribute a document draft for review. Reviewers can attach posted notes to the document, and when done, return the document to the author. The author can then examine the posted notes and take action on each. (An author can also create posted notes in the document.) A reviewer need not have the same software as the author. Instead, the reviewer can use a standard annotation application. This application reads the data from the author's draft, and creates an annotatable presentation of the data. (Creating such a presentation is part of the standard data encapsulator protocol.)

The reviewer can create selections in the document, and link posted notes to the selection. The link between the posted note and selection allows the system to position the posted note "near" the selection to which it refers. The links also make the annotation structure explicit, so that the system can implement standard commands to manipulate annotations. The contents of the posted note can be any data type implemented in the system, not simply text or graphics. The contents of a note is implemented using a data encapsulator, and opening a note results in creating an editable presentation on that data.

Data Representation

Data representation is concerned with answering the question of what is the data that Iam modeling? The subject invention provides facilities that help to model data. There are classes for modeling specific data types, including: text, structured graphics, sound and video. In addition to these specific classes, the invention provides a number of other abstractions that help to model a problem: the collection classes, the concurrency control and recovery framework, and the C++ language itself. In the subject invention, the class that encapsulates the data model for a particular data type is a subclass of the encapsulator class.

The Encapsulator Class

A developer creates a container for a particular type of data representation by creating a derived class of the encapsulator class. For each type of data in the system, (e.g. graphic objects, styled text, spreadsheet cells) a different derived class must exist which acts as the container for a type's data. Each class of encapsulator provides a type specific protocol for accessing and modifying the data contained therein. This protocol is typically used by presentations for displaying the data and by commands for modifying the data. In addition to type specific protocol, the encapsulator class provides generic protocol that supports the embedding of data encapsulators as "black-boxes" into other alien types. This protocol must be implemented in the derived class to support the creation of presentations, editors and selections for the encapsulated data. A container need only understand this generic protocol to support the embedding of any alien data type.

Choosing A Representation For Data

The data type designer has both the C++ object model, and a rich set of standard classes to choose from when designing a representation for a particular type of data. The classes provided by the invention should always be considered before designing unique classes to represent the data. This minimizes any duplication of effort which may occur by creating new classes which provide similar or identical function to classes already existing in the system. The most basic of these is the C++ object model. A designer can create a class or classes which closely match the mental model of the user to represent the classes the user deals with.

The invention's foundation classes provide many standard ways to represent data. Collection classes provide a number of ways for collecting together related objects in memory, ranging from simple sets to dictionaries. Disk-based collections, providing persistent, uncorrupted collections of objects, are also available. A data type requiring two (2D) and three dimensional (3D) graphic modeling, such as a graphical editor, is also supported. Numerous 2D and 3D modeling objects are provided along with transformation, matrix classes and 3D cameras. Similarly, the invention provides a sophisticated text data type that supports full international text, aesthetic typography, and an extensible style mechanism. The invention also provides support for time based media such as sound and video. Sophisticated time control mechanisms are available to provide synchronization between various types of time based media.

Presentation Protocol

The encapsulator class provides a protocol for the creation of various classes of presentations on the data contained within the encapsulator. The presentations include a thumbnail presentation, a browse-only presentation, a selectable presentation, and an editable presentation. There is also a protocol for negotiating sizes for the presentations and fitting the data into the chosen size. Subclasses of the encapsulator class are responsible for overriding and implementing this protocol to support the embedding of the data in other encapsulators. The presentations currently supported include:

Thumbnail—This presentation is intended to give the user a "peek" at what is contained in the encapsulator. It is typically small in size and may scale-down and/or clip the data to fit the size.

Browse-only—This presentation allows the user to view the data in its normal size but the user is unable to select or modify any of the data.

Selectable—This presentation adds the ability to select data to the capabilities provided by the browse-only presentation. It is used in annotating to allow annotations to be tied to selections in the data without allowing modification to the data itself. The selectable presentation is typically implemented as a subclass of the browse-only presentation.

Editable—This presentation adds the ability to modify data to the capabilities provided by the selectable presentation. This is the presentation that allows the user to create new data and edit existing data. Currently, this presentation provides its own window for editing. It is likely that in the future support will be added for presentations which allow editing in place. The editable presentation is typically implemented as a subclass of the selectable presentation.

Change Notification

When the data contained in an encapsulator class is changed, it is necessary to provide clients (e.g. a view on the data) with notification of the change. Encapsulators rely on a built-in class for standard notification support to allow the encapsulator to notify clients of changes to the data representation. A client can connect to an encapsulator for notification on specific changes or for all changes. When a change occurs the encapsulator asks the model to propagate notification about the change to all interested clients.

Data Presentation

This section addresses how the system presents data to a user. Once the data has been represented to the system, it is the role of the user interface to present the data in an appropriate and meaningful way to a user. The user interface establishes a dialogue between the user and the model data. This dialogue permits a user to view or otherwise perceive data and gives a user the opportunity to modify or manipulate data. This section focuses on data presentation.

The User Interface

A developer creates a class to facilitate the presentation of data to interact with a data encapsulator. By separating the data model from the presentation, the invention facilitates multiple presentations of the same data. Some applications, like the Apple® Macintosh Finder, already support a limited form of multiple presentations of the same data. Sometimes it is useful to be able to display different views of the same data at the same time. These different views might be instances of the same class—as in a 3D CAD program which shows four different view of the same data. For each kind of presentation, a user was previously required to write a view which can display the model and a set of trackers and tracking commands which can select and modify the model.

Static Presentations

The simplest presentation type is the name of the data. The name is a text string that indicates the data content or type. Examples include "Chapter 4", "1990 Federal Income Taxes", "To Do". Another simple presentation type, an icon, is a small graphical representation of the data. It usually indicates the data type. Examples are a book, a report, a financial model, a sound or video recording, a drawing. However, they may also display status, such as a printer that is printing, or indicate content, such as a reduced view of a drawing. Finally, the thumbnail, is a small view of the model data. This view may show only a portion of the data in order to fit the available space. Examples are a shrunken drawing, a book's table of contents, a shrunken letter, or the shrunken first page of a long document. A browse-only presentation allows a user to view the data in its normal size but the user is unable to select or modify any of the data.

Selectable Presentations

Selectable presentations allow a user to view, explore, and extract information from the data. These presentations provide context: what the data is, where the data is, when the data was. It may help to present the data in a structured way, such as a list, a grid, as an outline, or spatially. It is also useful to display the relationships among the data elements, the data's relationship to its s container or siblings, and any other dependencies.

Selectable presentations may also display meta data. An example is the current selection, which indicates the data elements a user is currently manipulating. Another type of meta data is a hypermedia link between data elements. The view may also indicate other users who are collaborating on the data.

Selectable presentations are usually very specific to the type of the data. They are made up of windows, views, and other user interface objects which may be customized to best reflect the data type. Some examples are:

Sound recording—A control panel would facilitate an audible presentation. Views would display the sound as a musical score or as a series of waveforms. Views may include a sample number or time indications.

Financial model.—The model could be viewed as the set of formulas and other parameters. It could display values from the model at a particular instance of time or with specific input values as a spreadsheet or in various graphical forms.

Book.—The model could be viewed as a table of contents, an index, a list of illustrations. It could be viewed as a series of pages, a series of chapters, or a continuous text flow.

Video recording—The model could be viewed as a series of individual frames or as a continuous presentation. Views may include track marks, frame number, and time indications.

Container containing other objects—The objects could be displayed alphabetically by name, by type or other attribute, as a set of icons, as a set of thumbnails.

Editable Presentations

Editable presentations are similar to interactive presentations except that they also facilitate data modification. They do this by allowing direct manipulation of the data with the mouse or other pointer. They also allow the data to be manipulated symbolically through menu items and other controls.

Data Access

Presentations interact with data encapsulators in order to determine the data and other information to present. Presentations query the model for the data that is required. The presentation may present all or only part of the data that is contained or can be derived from the data in the data encapsulator.

Change Notification

Because there can be many presentations of a single model active at once, the data can be changed from many sources, including collaborators. Each presentation is responsible for keeping itself up to date with respect to the model data. This is accomplished by registering for notification when all or a portion of a model changes. When a change occurs to data in which the presentation is interested, the presentation receives notification and updates its view accordingly. Change notification can be generated in any of the ways listed below. First, change notification can be generated from the method in the data encapsulator which actually changes the model data. Second, change notification can be generated from the command which caused the change. As mentioned earlier, there are benefits to these two approaches. Generating the notification from within the data encapsulator guarantees that clients will be notified whenever the data changes. Generating the notification from the command allows "higher-level" notification, and reduces the flurry of notifications produced by a complicated change.

NOTIFICATION FRAMEWORK OVERVIEW

The Notification framework provides a mechanism for propagating change information between objects. The framework allows objects to express interest in, and receive notification about changes in objects on which they depend. A standard interface is provided for classes that provide notification to clients. Notifier classes provide notification source objects with the means to manage lists of clients and dispatch notifications to those clients. Notifier objects require no special knowledge of the class of objects receiving notifications. Connection objects provide the dispatch of notifications from the notifier to specific notification receiver objects. These connection objects allow specialization of how notifications are delivered to different classes of receivers. Finally, Notification objects transport descriptive information about a change, and interests describe a specific notification from a notification source object.

NOTIFICATION PROPAGATION FLOW CHART

Figure 18:
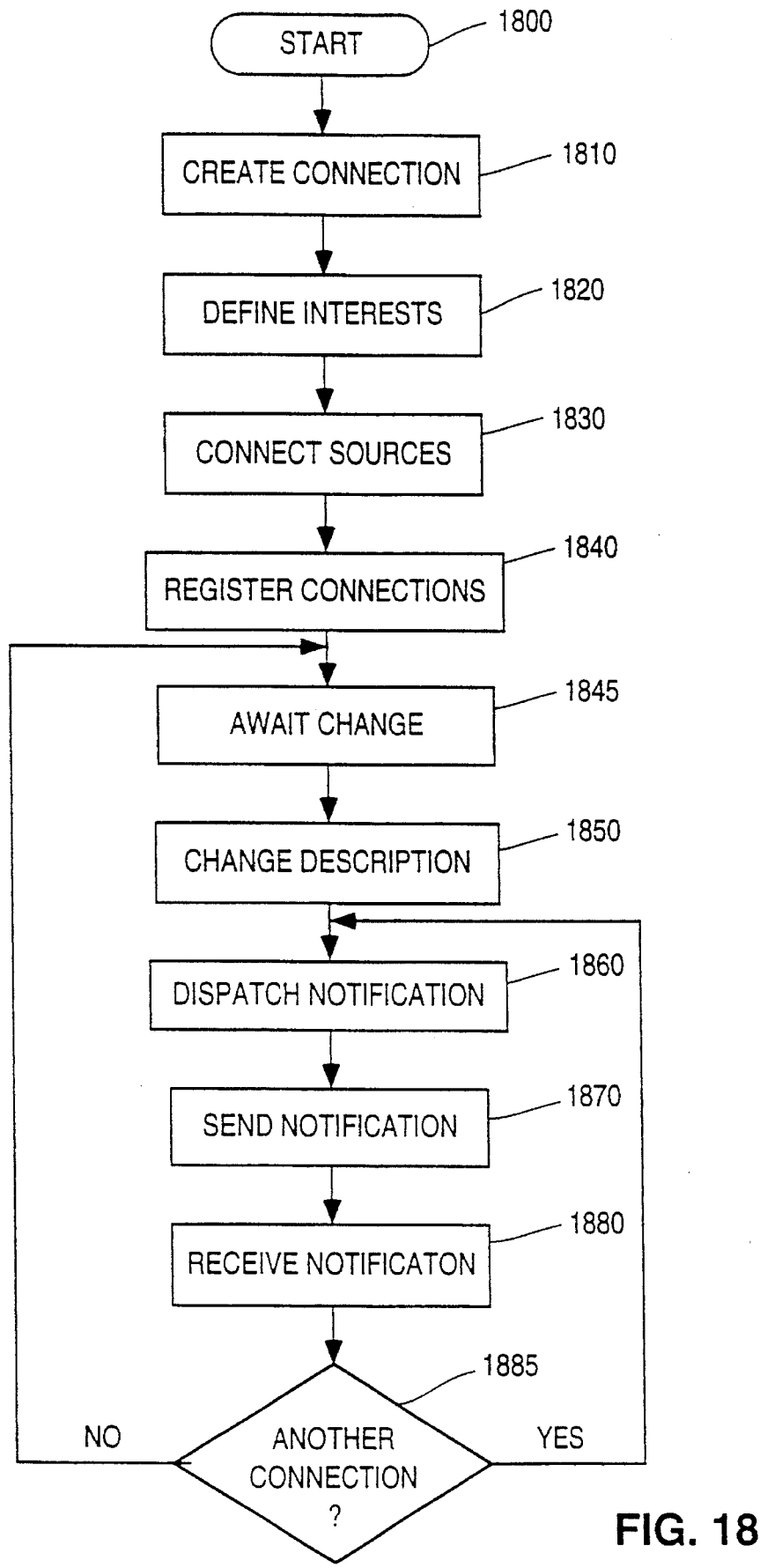
FIG. 18 is an object generating notification flowchart for a notification source object in accordance with the subject invention.

FIG. 18 is an object generating notification flowchart for a notification source object. Processing commences at terminal 1800 and immediately passes to function block 1810 where a notification receiver object creates a connection to itself. Then, at function block 1820 the notification receiver object adds appropriate interests for one or more notifications from one or more notification source objects. These interests are defined by the notification source object(s).

The client object asks the connection object to connect to the notification source(s) for notifications specified by the interests in the connection in function block 1830. Then, in function block 1840, for each interest in connection, the connection is registered as interested in the notification with the notifier in the interest. Next, at function block 1845, the system enters a wait state until a change is detected. When a system change occurs, control immediately passes to 1850 where a notification source object changes and calls notify on its notifier with a notification describing the change.

For each connection registered with the notifier as interested in the notification, at function block 1860, the connection is asked to dispatch the notification. In turn, at function block 1870, the connection dispatches the notification to the appropriate method of the notification receiver. Finally, at function block 1880, the notification receiver takes the appropriate action for the notification, and a test is performed at decision block 1885 to determine if another connection is registered with the notifier as interested in notification. If there is another connection, then control passes to 1850. If there is not another connection to service, then control passes to function block 1845 to await the next change.

Data Specification

Data specification addresses the selection issue of data processing. If a user must manipulate data contained in a representation, the data must be able to specify subsets of that data. The user typically calls this specification a "selection," and the system provides a base class from which all selection classes descend. The invention also provides selection classes for all of the fundamental data types that the system supports.

Model Selection

The object which contains the specification of a subset of data in a representation is a model selection class. In the case of a text representation, one possible selection specification is a pair of character offsets. In a structured graphics model, each shape must be assigned a unique id, and the selection specification is a set of unique ids. Neither of the specifications point directly at the selection data and they can be applied across multiple copies of the data.

Accessing Specified Data

A selection understands the representation protocol for accessing and modifying data and knows how to find data in a local address space. Command objects access a representation's data through data selection, and therefore require no knowledge of converting from specification to the real data in the local model. It is the job of the selection object to provide access to the real data from the address space independent specification. In a text encapsulator, this processing may require querying the encapsulator for the actual characters contained in a range. In a base model such as a graphical editor the selection will typically hold surrogates for the real objects. The encapsulator must provide a lookup facility for converting the surrogate to the real object.

Standard Editing Protocol

The model selection class provides a protocol for the exchange of data between selections. By implementing the protocol for type negotiation, absorbing, embedding and exporting data, derived classes provide support for most of the standard editing commands. This means that the editing commands (Cut, Copy, Paste, Push Data, etc.) provided by the system will function for the represented data type and will not require reimplementation for each application. The model selection class also provides support directly for the exchange of anchors and links but relies on the derived class's implementation of several key methods to support the exchange of the representation's data:

CopyData must be implemented by the derived class to export a copy of the specified data. The implementation creates and returns a new data encapsulator of the requested type containing a copy of the specified data.

AdoptData must be implemented by the derived class to support absorbing or embedding data into the specification's associated representation. If the data is to be absorbed it must be of a type which can be incorporated directly into the receiver's representation. The absorbed data is added to the representation as defined by the specification. It is common for many data types to replace the currently specified data with the newly absorbed data. Any replaced data is returned in a data encapsulator to support Undo. If the data is to be embedded, the encapsulator is incorporated as a black box and added as a child of the representation.

ClearData must be implemented by the derived class to delete the specified data from the associated representation. An encapsulator of the representation's native type containing the deleted data must be returned.

User Interface

The user interface for creating specifications is typically the responsibility of a presentation on the data. A number of mechanism are available depending on data type and presentation style. The most favored user interface for creating a selection is direct manipulation. In a simple graphics model, objects may be selected by clicking directly on the object with the mouse or dragging a selection box across several objects using a mouse tracker. In text, a selection may be created as the result of a find command. Another common way that selections are created is as a result of a menu command such as "find." After the command is issued, the document is scrolled to the appropriate place and the text that was searched for is selected.

Finally, selections can come from a script (or programmatically generated) and the result would be the same as if a user created the selection directly. "Naming" selections for scripts involve creating a language for describing the selection. For example, in text, a selection could be "the second word of the fourth paragraph on page two." The invention's architecture provides support for scripting.

Data Modification

Data Modifications addresses the question: what are the commands that can operate on this selection? If a user is to modify the data contained in a representation, the system must be able to specify exactly the type of modification to be made. For example, in a word processing program, a user may want to change the style of a selected range of characters. Or, in a structured graphics program, a user may desire rotation of a graphic object. All user actions that modify the data contained in a data encapsulator are represented by "command objects."

The Model Command Object

The abstract base class that represents a command made by the user is the model command object. Subclasses of the model command object capture the o semantics of user actions, such as: can be done, undone, and redone. These subclasses are independent of the user interface technique used to create them. Unlike MacApp, as soon as the semantics of a user action is known, device events are translated into command objects by the system.

HandleDo, HandleUndo, and HandleRedo

Creating a new class of command involves overriding a number of methods. The most important three methods to override are: HandleDo, HandleUndo and HandleRedo. The HandleDo method is responsible for changing the data encapsulator appropriately based on the type of command that it is and the selection the command is applied to. For example, if the command involves a style change to a range of characters in a word processor, the HandleDo method would call a method (or set of methods) in the data encapsulator to specify a character range and style to change. A more difficult responsibility of the HandleDo method is saving all of the information necessary to "undo" this command later. In the style change example, saving undo information involves recording the old style of the character range. The undo information for most commands is very simple to save. However, some commands, like find and change may involve recording a great deal of information to undo the command at a later time. Finally, the HandleDo method is responsible for issuing change notification describing the changes it made to the data encapsulator.

The HandleUndo method is responsible for reverting a document back to the state it was in before the command was "done." The steps that must be applied are analogous to the steps that were done in the HandleDo method described above. The HandleRedo method is responsible for "redoing" the command after it had been done and undone. Users often toggle between two states of a document comparing a result of a command using the undo/redo combination. Typically, the HandleRedo method is very similar to the HandleDo method except that in the Redo method, the information that was derived the last time can be reused when this command is completed (the information doesn't need to be recalculated since it is guaranteed to be the same).

User Interface

Command objects capture the semantics of a user action. In fact, a command represents a "work request" that is most often created by a user (using a variety of user interface techniques) but could be created (and applied) in other ways as well. The important concept is that command objects represent the only means for modifying the data contained in a data encapsulator. All changes to the data encapsulator must be processed by a command object if the benefits of infinite undo, save-less model, and other features of the invention are to be realized.

The most favored user interface for issuing commands involves some sort of direct manipulation. An object responsible for translating device events into commands and "driving" the user feedback process is known as a tracker. The invention provides a rich set of "tracking commands" for manipulating the built-in data types. For example, there are tracking commands for rotating, scaling and moving all the 2D objects in Pink such as lines, curves, polygons, etc.

A common user interface for issuing commands is via controls or the menu system. Menus are created and a set of related commands are added to the menu. When the user chooses an item in the menu, the appropriate command is "cloned" and the Do method of the command is called. The programmer is never involved with device events at all. Furthermore, because commands know what types of selections they can be applied to, menu items are automatically dimmed when they are not appropriate.

Finally, commands can be issued from a script (or programmatically generated) and the result would be the same as if a user issued the command directly. The Pink architecture provides support for scripting; however, at this time, there is no user interface available for creating these scripts.

Built-in Commands

The invention provides a large number of built-in command objects for all of the built-in data types as well as providing generic commands for Cut, Copy, Paste, Starting HyperMedia Links, Completing Links, Navigating Links, Pushing Data on Links, Pulling Data on Links, as well as many user interface commands. One of the advantages of using the frameworks is that these built-in command objects can be used with any data encapsulators.

More Features

The previous sections of this document concentrated on the foundational features of the invention. There are many additional facilities in the invention that implement advanced features. Specifically, these facilities include: model-based tracking, filing, anchors, and collaboration.

Model Based Tracking

Tracking is the heart of a direct-manipulation user interface. Tracking allows users to select ranges of text, drag objects, resize objects, and sketch objects. The invention extends tracking to function across multiple views and multiple machines by actually modifying the model. The tracker issues commands to the model, which posts change notifications to all interested views.

Model based tracking is the best solution for tracking in documents, but it does have the drawbacks that: (1) the model's views must be optimized to provide quick response to change events and (2) the model must be capable of expressing the intermediate track states.

Anchors

Persistent selections or "anchors" are very similar to selections in that they are specifications of data in a representation. The difference is that anchors must survive editing changes since by definition anchors persist across changes to the data. The implementation of graphics selections described earlier in the document is persistent. The implementation of text selections, however, is not. If a user inserts or deletes text before a selection, then the character offsets must be adjusted. There are a couple of approaches for implementing text anchors. First, the text representation maintains a collection of markers that point within the text, similar to the way styles are maintained. The anchors include an unique id that refers to a marker. When the text is changed, the appropriate markers are updated, but the anchors remain the same. Another approach is to maintain an editing history for the text. The anchor could contain a pair of character positions, as well as a time stamp. Each time the text was edited, the history would be updated to record the change (e.g., 5 characters deleted from position X at time T). When the anchor is used, the system would have to correct its character positions based on editing changes that happened since the last time it was used. At convenient times, the history can be condensed and the anchors permanently updated.

The system provides a large number of features for "free" through the anchor facility. All of the HyperMedia commands (CreateLink, PushData, PullData, and Follow) all use anchors in their implementation. The implementation of the system wide annotation facility uses anchors in its implementation. The base data encapsulator provides services for keeping track of anchors and links. However, the user is responsible for making anchors visible to the user via presentations. The application must also issue the proper command object when a user selects an anchor. After a user interface for anchors and links is nailed down, the document framework provides additional support to simplify processing.

Filing

Filing is the process of saving and restoring data to and from permanent storage. All a user must do to make filing work is to implement the streaming operators for a data encapsulator. The invention's default filing is "image" based. When a user opens a document, the entire contents of the document are read into memory. When a user closes a document, the entire contents of the document are written back to disk. This approach was selected because it is simple, flexible, and easy to understand. To store data in a different format, perhaps for compatibility with a preexisting standard file format, two approaches are possible. First, an encapsulator class can stream a reference to the actual data, then use the reference to find the actual data, or a new subclass can be defined to create and return a file subclass.

The advantage of the first approach is a data encapsulator can be encapsulated in other documents. The advantage of the second approach is the complete freedom afforded to exactly match an existing file format for the complete document.

Collaboration

Same-time network collaboration means that two or more people edit the same document at the same time. The system also establishes the collaboration policy; that is, whether users are forced to take turns when changing the data or can make changes freely. A developer does not have to worry about the mechanics of collaboration or the collaboration policy.

Supporting Collaborator Selection Styles

To assist in the reduction of confusion and enhance model selection, the document architecture provides a collaborator class which contains information about the collaborator's initials and preferred highlight bundle.

Supporting Multiple Selections

To support multiple selections a user must modify presentation views because each collaborator has a selection. When the active collaborator's selection changes the standard change notification is sent. When a passive collaborator's selection changes a different notification event is sent. A view should register for both events. Since the action taken to respond to either event is usually the same, economy can be realized by registering the same handler method for both events.

User Interface In Accordance With The Invention

This portion of the invention is primarily focused on innovative aspects of the user interface building upon the foundation of the operating system framework previously discussed. The first aspect of the user interface is a mechanism allowing a user to manage interactions with various objects or data referred to as controls.

Control

The object with which users interact to manipulate other objects or data is called a control. Controls use a command to determine the current state of the object or data. Following appropriate interactions with the user, the control updates the command's parameters and causes it to be executed. Example controls are menus, buttons, check boxes and radio buttons.

Controls use a command to determine the current state of the object or data. Following appropriate interactions with the user, the control updates the command's parameters and causes it to be executed. For example, a checkbox sets a command parameter to on or off and then executes the command to change a data value.

Many controls display the current value of the data they manipulate. For example, a check box displays a check only when a Boolean data value is TRUE. As the data changes, the control's appearance is kept up to date using a notification system described here. The process is similar to the process used to enable/disable menu items.

When a control is created a command must be specified. The control makes a copy of this command and stores it in field fCommand. If the command supplies any data values, a pointer to appropriate Get and Set methods of the command must also be specified. The control stores these method pointers in fields fGetMethod and fSetMethod, respectively. Then, the control connects for notifications that indicate its data value may be out of date. Each command provides a method called ConnectData for this purpose.

Figure 3:
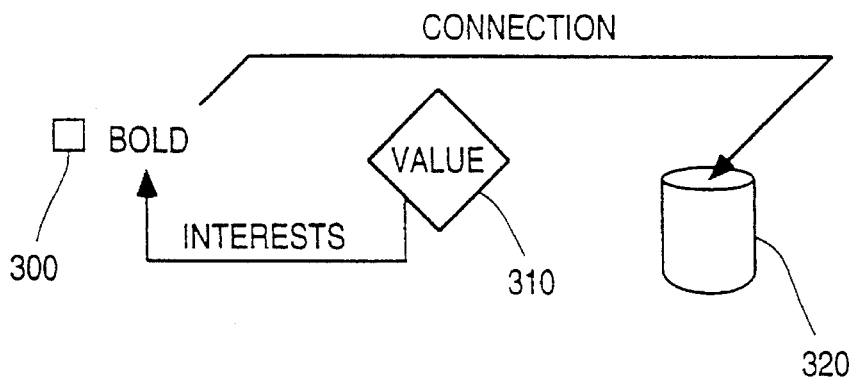
FIG. 3 is a flow diagram of a command process in accordance with the subject invention.
Figure 5:
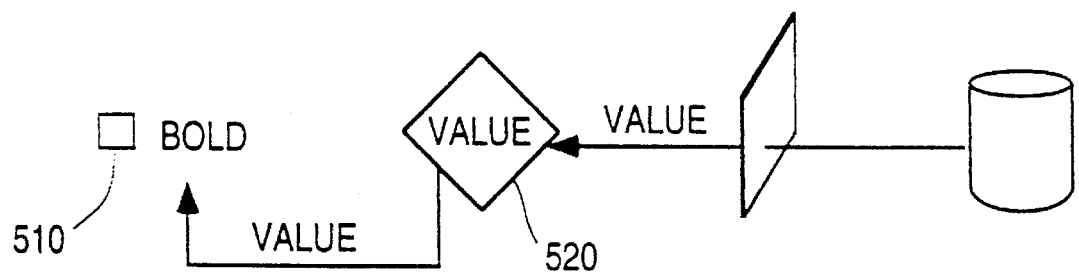
FIG. 5 is a checkbox control activation in accordance with the subject invention.

Each control contains a connection object called fDataConnection indicating the object and method to receive the notification. This connection object passed as an argument to the command. The command object calls the connection object's Connect method to add each notifier and interest that may affect its data value. When complete, the control calls the connection object's Connect method to establish the connections as shown in FIG. 3. The control updates its data value from its command. It does this by calling the Get method of the command (fCommand-<(*fGetMethod)()). The control stores this value in an appropriate field (e.g. a checkbox stores it in a Boolean field named fChecked) as depicted in FIG. 5. Then, the control updates its appearance. It performs this action by calling the view system's invalidate method, indicating which portion of the screen needs updating.

Figure 4:
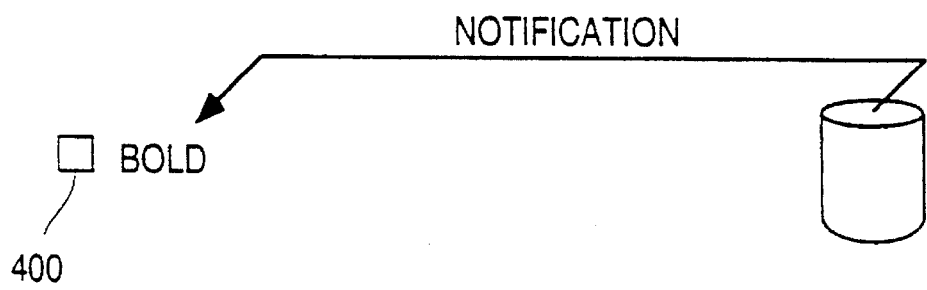
FIG. 4 is a checkbox control in accordance with the subject invention.

Finally, the data changes and notification is sent. At some point, a command is executed which changes the value of the data being reflected by the control. This command could be executed from a control, menu item, or through direct manipulation. The control receives the notification as shown in FIG. 4, and control is passed to await the next user selection.

Control Panel

One collection of controls is called a control panel. The controls in a control panel typically operate upon actual data (this is the default, not a requirement). Their actions are usually immediate and are independent from one another. Control panels manage the progression of the input focus among its controls as necessary. It is likely that control panels will be shared across all user interfaces in the system.

Dialog Box

Another collection of controls is called a dialog box. The controls in a dialog box typically operate upon prototypical data (this is the default, not a requirement). Their actions are usually collected together into a group and then performed together when the user presses an Apply button. Dialog boxes manage the progression of the input focus among its controls as necessary.

A Control in Action

Figure 2:
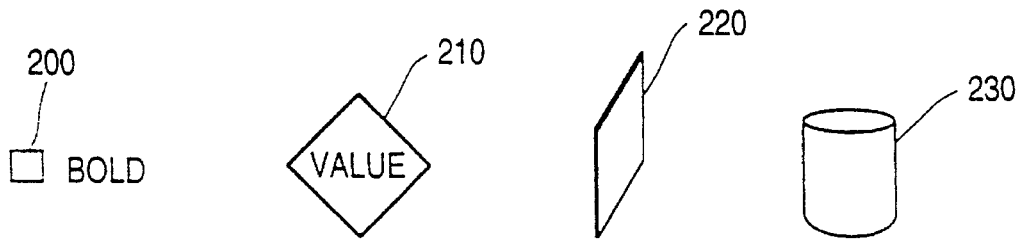
FIG. 2 illustrates the tools used to create an application in accordance with the subject invention.

We would now like to present a play in three acts to illustrate a control in action. FIG. 2 illustrates the various controls. A play example will be used by way of analogy to illustrate a control (in this case a checkbox), a command, a selection, and a data encapsulator.

Checkbox 200 The role of the checkbox is to display a Boolean value stored in the data encapsulator and to facilitate its change. The value is represented by the presence or absence of a check.

Command 210 The role of the command is to obtain the value from the data encapsulator and change it upon direction from the checkbox.

Selection 220 The role of the selection is to be an interface between the command and the data.

Data 230 Data is employed as a target for actions.

Getting to Know You

Everyone gets to know each other a little better as shown in FIG. 3. The command 310 tells the checkbox 300 which notifications the data may send in which the control is certain to be interested (how the command 310 knows is none of anyone else's business). The checkbox 300, in turn, connects to the data 320 for the notifications.

Unknown to anyone else, the director told the checkbox 300 the best way to interact with the command 310. Specifically, it was told about the command's get value method and a set value method. The checkbox will take advantage of this a little bit later.

Reflecting the Data

Something happens to the data—it sends notifications as depicted in FIG. 4. The checkbox 400 hears about those for which it has expressed an interest. In FIG. 4, the notification from the data expresses to bold the information which is reflected by placing an X in the checkbox.

The checkbox 510 received notification from the data, and the processing to display the checkbox 510 correctly is depicted in FIG. 5. It does this by using the command's 520 get value method it happens to know about. Before telling the checkbox 510 what the correct value is, the command 520 goes through the selection to the data to make sure it really knows the correct value. The checkbox 510 updates itself as necessary.

Changing the Data

Figure 6:
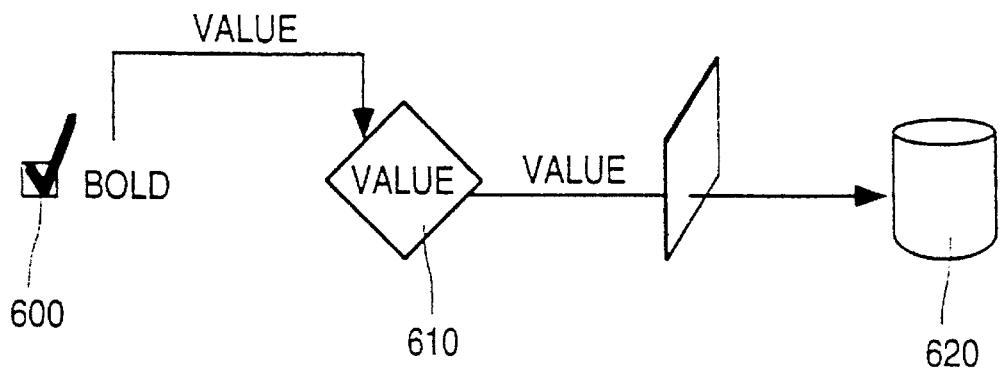
FIG. 6 is a checkbox update in accordance with the subject invention.
Figure 7:
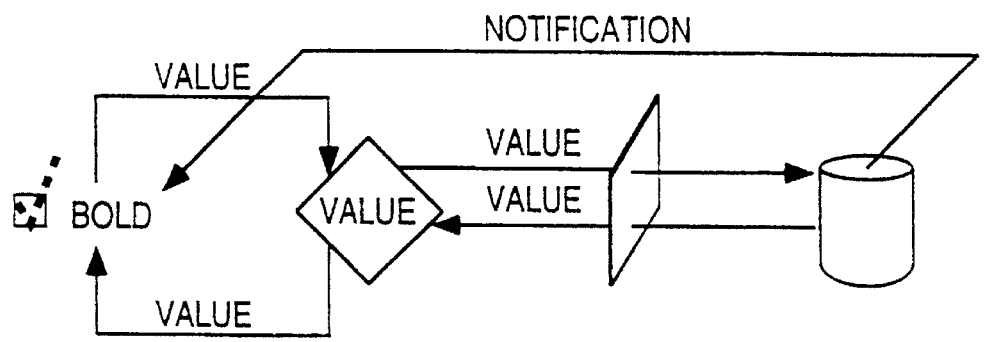
FIG. 7 is a summary of checkbox control processing in accordance with the subject invention.

The user now enters the scene and gives the checkbox 600 a nudge as shown in FIG. 6. The checkbox 600 uses the command's 610 set value method to set the data's 620 value through the selection. The entire process is reviewed in FIG. 7.

A Control Panel in Action

Figure 8:
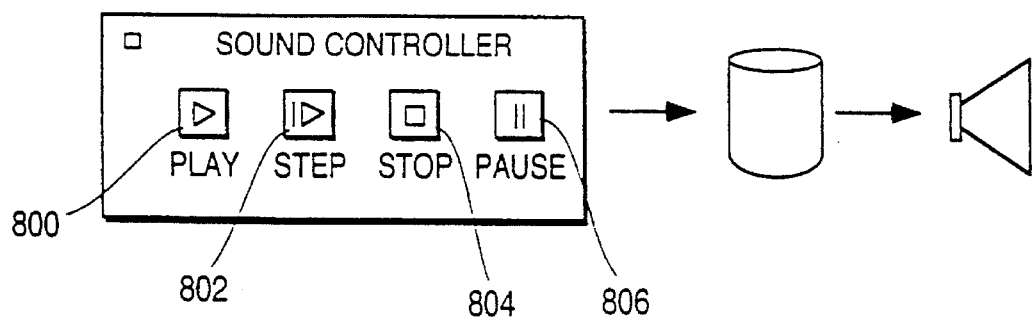
FIG. 8 is an illustration of a control panel in accordance with the subject invention.

A control panel is nothing more than a simple window that contains a set of controls as shown in FIG. 8. These controls contain a command that operates upon the current selection. The control is enabled if the command is active. Following appropriate interaction with the user, the control executes the command, causing the data to change.

A Sound Control Panel

As an example control panel, consider the sound controller illustrated in FIG. 8. This control panel contains four buttons 800, 802, 804 and 806 for controlling sound playback. Each button performs as described in the "A Control in Action" section above.

Play 800 This control contains a TPlay command. This command is active only under certain conditions, making the control enabled only under those conditions. First, a sound must be selected in the appropriate data encapsulator. Next, it must not be playing already. Finally, the current sound position must be somewhere before the end. When pressed, the Play button executes the TPlay command, causing the selected sound to come out of the speaker.

Step 802 This control contains a TPlay command, too. How is this, you ask? Well, since I am making this up, we can pretend that the TPlay command takes a parameter indicating the duration it is to play. For the purposes of the step button, it is set to a single sample. The Step button is enabled only under the same conditions as described for the Play button. When pressed, the Step button executes the TPlay command, causing the selected sound to come out of the speaker.

Stop 804 This control contains a TStop command. The Stop button is enabled only if the selected sound is currently playing. When pressed, the Stop button executes the TStop command, causing the selected sound to stop playing and to set the current sound position to the beginning.

Pause 806 This control contains a TStop command, too. Unlike the Stop button, however, this TStop command is set to not rewind the sound to the beginning. Pressing the Play or Step buttons continue from where the playback left off.

A Dialog Box in Action

A dialog box is similar to a control panel, in that it is a simple window containing a set of controls. However, instead of the controls operating upon the selected data, they operate upon parameters of another command. Only until the Apply button is pressed is the real data modified.

A Color Editor

Figure 9:
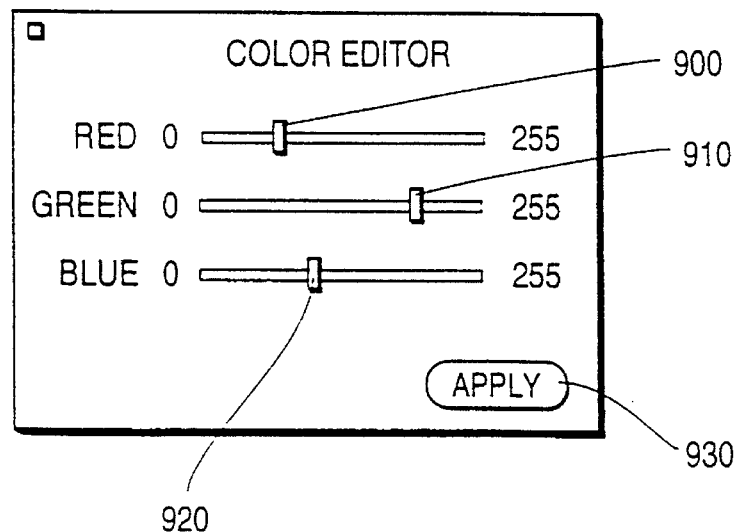
FIG. 9 is an illustration of a dialog box in accordance with the subject invention.

As an example dialog box, consider the color editor set forth in FIG. 9. It contains three sliders, one for the red 900, blue 910, and green 920 components of the color. After adjusting the sliders to the desired values, the user presses Apply 930 to change the color of the selection.

Red 900, Green 910, Blue 920 To the user, these sliders are identical, except for their label. As with all controls, each slider contains a command that is executed following user interaction. Unlike many controls, especially those in a control panel that immediately affect the selected data, the command contained by these sliders displays and modifies the value of a parameter of another command. In this case, it is one of the red, green, or blue parameters of the command contained within the Apply button.

Figure 10:
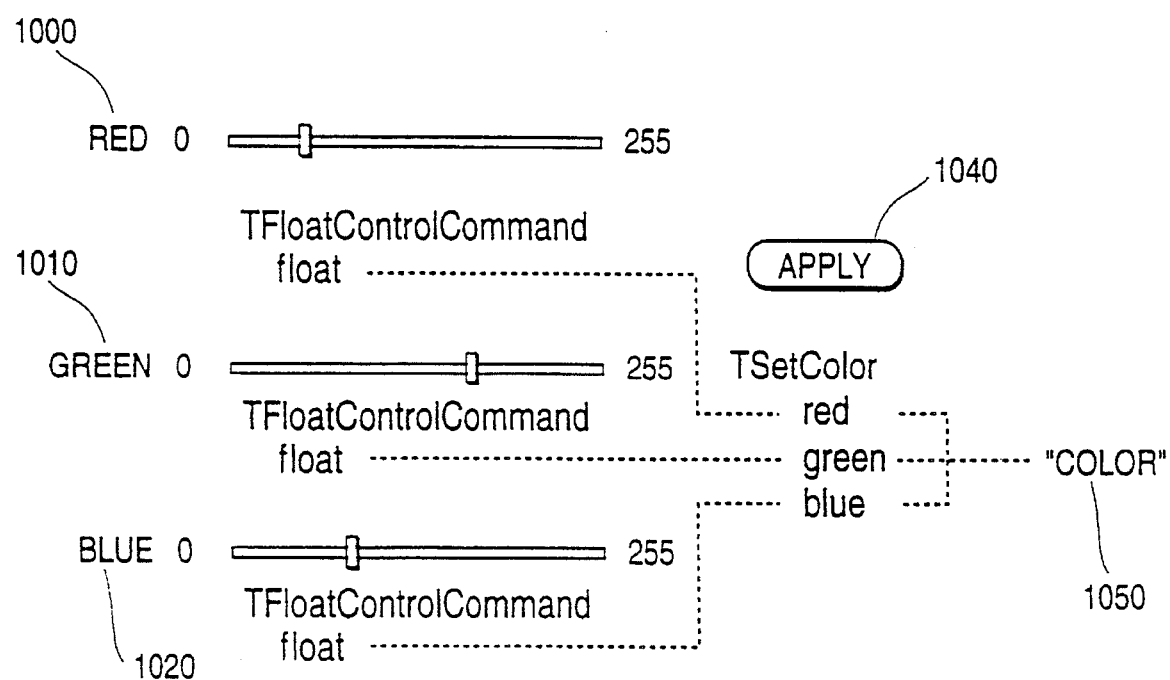
FIG. 10 is an illustration of a dialog box color controller in accordance with the subject invention.

Apply 930 The Apply button contains a TSetColor command that changes the color of the selection when executed. It has three parameters, one for each of the red, green, and blue components of the color. These parameters are displayed and set by the sliders in response to user interaction. When the Apply button is pressed, this command is executed and the new color is set. The internal actions accompanying the color editor example, are depicted in FIG. 10. The Red 1000, Green 1010, and Blue 1020 slides contain a TFloatControlCommand. These commands contain a single floating point value which the control displays. As the user adjusts the slider, it updates this value and executes the command.

The selection for the TFloatControlCommand specifies the TSetColor command within the Apply 1040 button. One of its parameters is set when each TFloatControlCommand is executed. Finally, when the user presses the Apply 1040 button, the TSetColor command is executed and the selected color 1050 is changed.

Classes

The following section describes the classes of the controls and dialog areas and their primary methods.

Control

A control is the user interface to one or more commands. The control displays information about a command, such as its name and whether it is active in the current context. Following appropriate user interaction, the control causes a command to be executed. When appropriate, the control obtains the current value of data the command modifies and displays it to the user. It may set a command parameter that indicates a new value of this data before executing the command.

Methods to create a selection on the control, with additional specification of a command within the control as an option. Lookup command is a pure virtual function in order to give subclasses flexibility in how many commands they contain and how they are stored.

Methods that are called when the presentation is opened and closed. When the presentation is opened the control connects for notifications that may affect its state. When the presentation is closed these connections are broken.

Methods that are called when the presentation is activated and deactivated. When the presentation is activated, some controls connect for notifications that are valid only when active. Deactivating the presentation breaks these connections.

Methods that control uses to connect to and disconnect from notifiers that affect whether the control is enabled. ConnectEnabledNotifiers connects to the notifiers specified by commands when the control is opened. DisconnectEnabledNotifiers breaks these connections when the control is closed.

Methods that receive notifications indicating that something happened affecting the control's presentation of a data value. This method does nothing by default.

Methods for notification. Create interest creates an interest specialized by the control instance. Notify is overloaded to send a notification and swallow the interest.

The Control Interest

A single notifier is shared among many subclasses of controls. In order to express interest in a particular control instance, the interest must be specialized. A control interest is an interest that contains a pointer to a specific control. This class is an internal class that is usually used as is, without subclassing.

The Control Notification

A single notifier is shared among many subclasses of controls. In order to distinguish which control sent the notification, the notification must be specialized. A control notification is a notification containing a pointer to the control that sent the notification. This class is usually used as-is, without subclassing.

The Control Presenter

A control presenter wraps up a control so it can be contained by a presentation data encapsulator. It implements standard behaviors that all presenter objects implement. This class is usually used as-is, without subclassing.

Methods that are called when the presentation is opened and closed. They do nothing by default. A subclass must implement these methods for the object it wraps. For controls, these methods are delegated directly to the control. When the presentation is opened, the control connects for notifications that may affect its state. When closed, the connections are broken.

Methods that are called when the presentation is activated and deactivated. They do nothing by default. A subclass must implement these methods for the object it wraps. For controls, these methods are delegated directly to the control. When the presentation is activated, some controls connect for notifications that are valid only when active. When deactivated, the connections are broken.

TControl Selection

A control selection specifies a single control, and optionally a command within it, that is wrapped in a control presenter and stored in a presentation.

Methods to access a command within the control. These may return an invalid value if no command was specified.

TUniControl

A unicontrol is the abstract base class for controls that present a single command and causes it to be executed following appropriate user interaction. Examples of this type of control are buttons and checkboxes.

Methods to specify the command that is presented and executed by the control. Notification is sent to registered connections when the command is changed.

Methods the control uses to connect to and disconnect from notifiers that affect whether the control is enabled. ConnectEnabledNotifiers connects to the notifiers specified by commands when the control is opened. DisconnectEnabledNotifiers breaks these connections when the control is closed.

Method that receives notifications indicating that something happened affecting whether the control should be enabled. UpdateEnabled checks whether the command is active and calls Enable and Disable as appropriate.

Methods that control uses to connect to and disconnect from notifiers that affect the control's presentation of a data value. ConnectDataNotifiers connects to the notifiers specified by commands when the control is opened. DisconnectDataNotifiers breaks these connections when the control is closed. Controls that do not display a data value (e.g. button) may override connect data notifiers to do nothing.

TButton

A button is a unicontrol that executes its command when pressed. This class is normally used without subclassing; just set the command and away you go.

Methods that are called when the presentation is activated and deactivated. When the presentation is activated, some controls connect for notifications that are valid only when active. When deactivated, these connections are broken. When the presentation is activated, buttons register for key equivalent notification. This connection is broken when the presentation is deactivated.

Methods that control users connecting to and disconnecting from notifiers that affect the control's presentation of a data value. Connect data notifiers connects to the notifiers specified by commands when the control is opened. Disconnect data notifiers breaks these connections when the control is closed. Controls that do not display a data value (e.g. button) may override connect data notifiers to do nothing.

The Checkbox

A checkbox is the user interface to a command that sets a Boolean value. Following appropriate user interaction, the checkbox calls a command method to change the value and executes the command. This class is normally used without subclassing; just set the command, its value getter and setter, and away you go.

The Slider

A slider is a unicontrol that displays a single floating point value and allows it to be changed following appropriate user interaction. Examples of sliders were presented in FIGS. 9 and 10.

TMultiControl

A multicontrol is the abstract base class for controls that present several commands and causes them to be executed following appropriate user interaction. Examples of this type of control are radio buttons and menus.

TRadioButton

Figure 11:
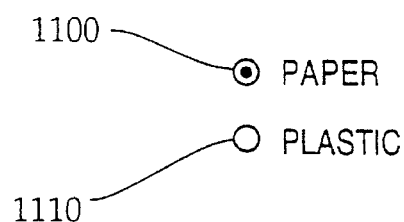
FIG. 11 is an illustration of a radio button in accordance with the subject invention.

A radio button is a multicontrol that displays two or more Boolean values and allows them to be changed following appropriate user interaction. The radio button enforces the constraint that exactly one button is selected as shown in FIG. 11. If Paper is selected, then the circle at 1100 is blackened. If Plastic is selected, then the circle at 1110 is selected. Both cannot be selected.

TCommand

A command encapsulates a request to an object or set of objects to perform a particular action. Commands are usually executed in response to an end-user action, such as pressing a button, selecting a menu item, or by direct manipulation. Commands are able to provide various pieces of information about themselves (e.g. name, graphic, key equivalent, whether they are active) that may be used by a control to determine its appearance. Subclasses must implement a method to examine the current selection, active user interface element, or other parameters in order to decide whether the command is active. Subclasses must override get active interest list to return notification interests that may affect whether this command is active.

Figure 12:
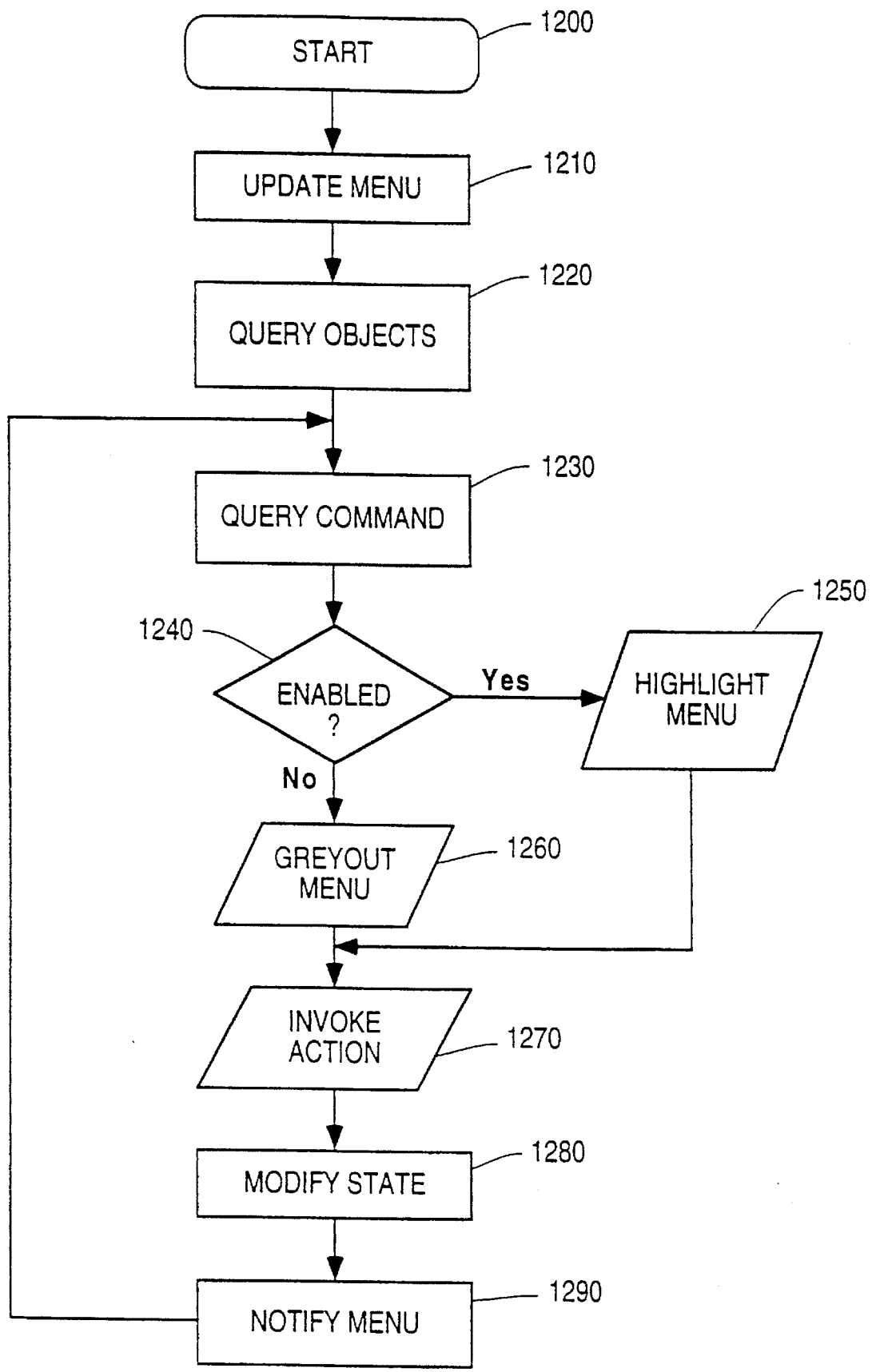
FIG. 12 is a detailed flowchart of menu state processing in accordance with the subject invention.

FIG. 12 is a flowchart depicting the detailed logic in accordance with the subject invention. The flowchart logic commences at 1200 and control passes directly to function block 1210 where a command objects are added to a menu. The steps carried out by this function block are: 1) create menu item from a command, where a menu item is another object data structure containing a command, 2) add a menu item to a list of menu items, and 3) mark the menu's appearance is invalid in data structure fValid. Then, later when the menu is pulled down, the appearance is recomputed based on the system state.

Each menu is a view. Views contain size and location information. Each menu contains a list of menu items. Each menu item contains a command and variables that reflect its current appearance. This includes whether the menu item is enabled (Boolean fEnabled), its name (TTextLabel fName), its graphic (TGraphicLabel fGraphic), and whether its appearance is currently valid (Boolean fValid). Each of these variables are determined by asking the command when the menu item was created.

Next, a query is sent to the command object for notification interests as depicted in function block 1220. Each command has four methods to connect for different types of notifications: i) notifications that affect it's name, ii) notifications that affect a graphic, iii) notifications that affect whether the command is active, and iv) notifications that affect any data. In this case, the menu item just created for the command connects for active notification. It does this by passing a connection object to ConnectActive. The command is then responsible for connecting the connection object to notifiers affecting whether the command is active. Then control is passed to function block 1230 to query a command for the enabled state when it is necessary to draw a menu item. To draw a menu item, menu item calls method "IsActive" for its command. The command looks at whatever system state it wants to and returns whether it is active as depicted in decision block 1240 in the current context (e.g. some commands only are active when a particular type of window is in front, or when a particular type of object is selected). Then, a menu item updates its internal state (a Boolean value in each menu item) and appearance as shown in function block 1250 and 1260 to match the value returned by the command.

Whenever a user action invokes any command as shown in input block 1270, a user causes a command to be executed. This could be from a menu item, control, or through direct manipulation of an object. This action causes a document state to be modified as shown in function block 1280, and a document sends notification as shown in function block 1290. When a document sends notification, the following steps are executed: 1) any menu item (or other control) connected for the notification sent by the document receives a notification message. This message includes the name of the change as well as a pointer to the object that sent the notification) a menu item then updates its state, and control is passed back to o function block 1230 for further processing.

Figure 13:
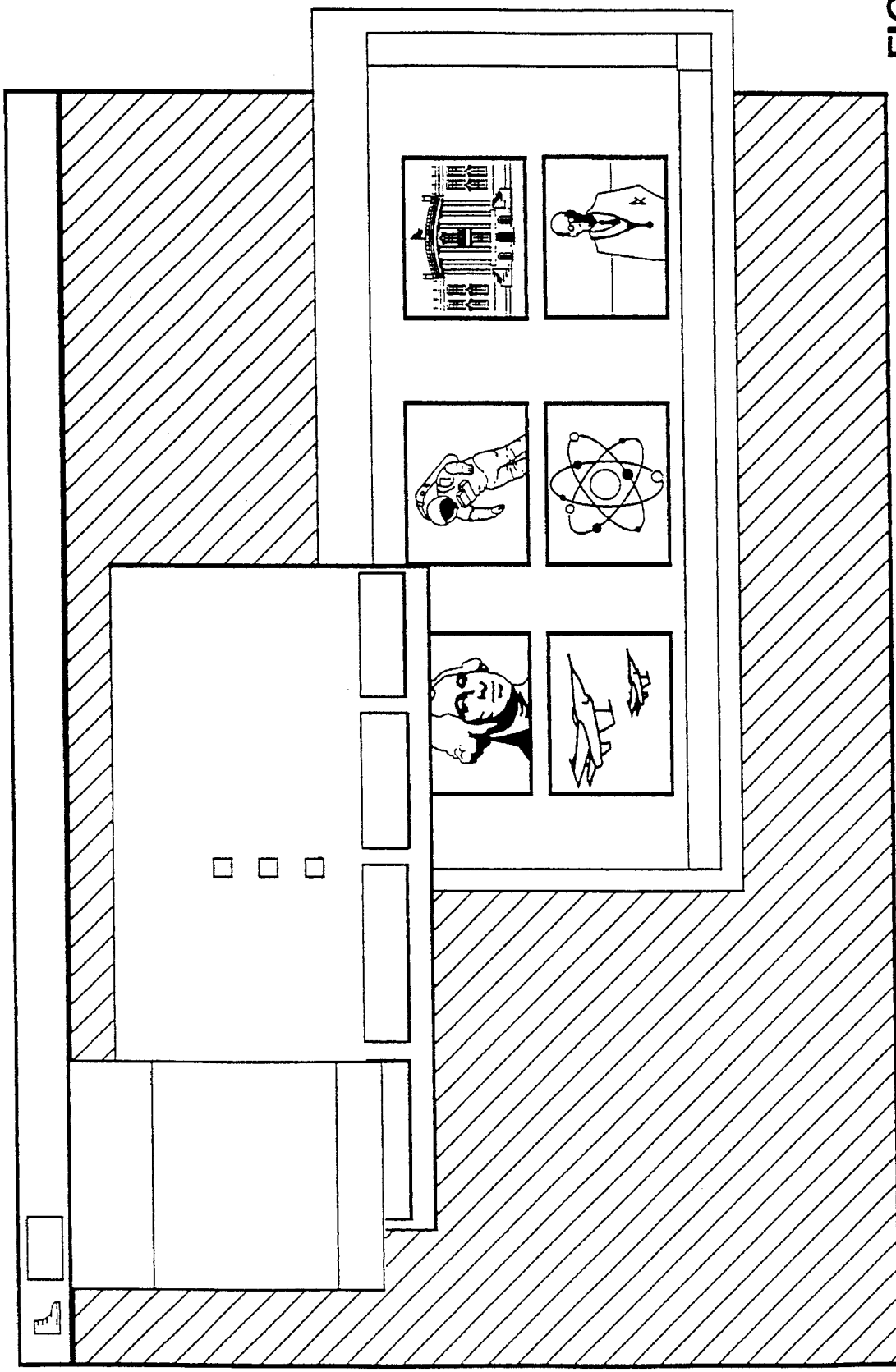
FIG. 13 is a picture of a display in accordance with the subject invention.

FIG. 13 is an illustration of a display in accordance with the subject invention. The menu item is Edit 1300 and has a number of sub-menu items associated with it. Undo 1310 is an active menu item and can thus be selected to carry out the associated functions. Redo 1320 is inactive and is thus presented in a greyed out fashion and cannot be selected at this time. A checkbox is also shown at 1360 as part of the debugging control panel 1350.

Presentation Templates and Persistence

Data presentations are created from templates and saved across sessions in a user interface object. The container for all data in the system is a model. A model contains and facilitates the manipulation of data. Data exchange is facilitated through cut, copy, and paste operations. Data reference is provided by selections, anchors, and links. Data models may be embedded into any other. Users interact with models through presentations (e.g. icon, thumbnail, frame, window, dialog, control panel) that are provided by an associated user interface. Data models delegate all presentation creation and access methods to another object, called the user interface.

A user interface is a model containing a set of presentations (e.g. icon, thumbnail, frame, window) for a particular model. When required, presentations are selected from those already created based on the type of presentation desired, the user's name, locale, and other criteria. If the desired presentation is not found, a new presentation is created and added to the user interface by copying one from an associated archive. Presentations may be deleted when persistent presentation information (e.g. window size and location, scroll positions) is no longer required.

A presentation contains a set of presentable objects that wrap user interface elements (e.g. menus, windows, tools) used to view and manipulate data. Presentations provide a reference to the data these objects present. Presentations install or activate presentable objects when the presentation is activated. Similarly, these objects are removed or deactivated when the presentation is deactivated. Presentations are identified according to their purpose (e.g. icon, thumbnail, frame, window) and retain yet-to-be-determined criteria (e.g. user identity) for later selection.

A presentation is made up of a collection of presentable objects (e.g. user interface elements) that are displayed on the screen or are otherwise available when the presentation is open or active.

Presentations are created from template presentations contained in an archive. These are made up of objects such as user interface elements, which are, in turn, made up of smaller objects such as graphics and text strings.

An archive is a model containing a set of template objects, including user interface elements (e.g. windows menus, controls, tools) and presentations (e.g. icon, thumbnail, frame, window).

Dialog Boxes & Control Panels

By using command objects in different ways, we can control two independent behaviors of a group of controls. The first is whether they affect the data immediately, or whether the user must press OK before the settings take effect. The second is whether they are independent from one another, or whether the settings represent an atomic operation.

Controls contain commands. As the user manipulates the control, the control sets parameters in the commands and cause it to be executed. Commands operate on model data specified by a selection.

Immediate

Controls that affect the data immediately contain a command that contains a selection that specifies real model data. As the user manipulates the control, the command causes this data to change. As the data changes, it sends change notification so that views and controls depending on the state of the data can accurately reflect the current state.

Delayed

Controls that are designed to not change the real data must operate on prototypical data, instead. The real model data is not changed until the user performs another action, such as pressing the OK button. This is accomplished in two ways:

The control contains a command that contains a selection that specifies the control itself. As the user manipulates the control, the command causes the control's value to change, but no other model data. When the user presses OK, a command in the OK button changes the real model data to match the values in each control the user may have manipulated.

The control contains a command that contains a selection that specifies a parameter of the command contained by the OK button. As the user manipulates the control, the command causes the OK button's command to change. When the user presses OK button, the OK button's command changes the real model data to match the values contained in itself.

Independent

Controls that act independently from one another require represent actions that can be individually undone after the control panel or dialog session is complete. This is the normal behavior of commands once they are executed by controls.

Atomic

Other sets of controls are designed to work together and should be undone and redone as an atomic operation. This is accomplished by putting a mark on the undo stack when the dialog box or control is started. When finished, either by dismissing the control panel or when the user presses an OK button (as in II B above), all of the commands executed since the mark was placed on the undo stack are collected together into a single command group. This group can then be undone or redone as a single group.

CANCEL

Control panels containing a CANCEL button (usually accompanied by an OK button, as in II B above) us a technique similar to that described III B above. A mark is put on the undo stack when the dialog box or control panel is started. If the user presses the CANCEL button, all commands placed on the undo stack since the mark are undone. This technique works regardless of whether the controls affect the data immediately or not.

Atomic Command Execution in Dialog Boxes

The object with which users interact to manipulate other objects or data is called a control. Example controls are menus, buttons, check boxes, and radio buttons. Each control contains a command, which implements an end-user action. Commands operate on data that is specified by a selection object. As the user manipulates the control it sets parameters in the command and causes it to be executed, thus changing the data value.

Controls that act independently from one another require represent actions that can be individually undone after the control panel or dialog session is complete. This is the normal behavior of commands once they are executed by controls. Other sets of controls are designed to work together and should be undone and redone as an atomic operation. This is the subject of this patent.

Figure 14:
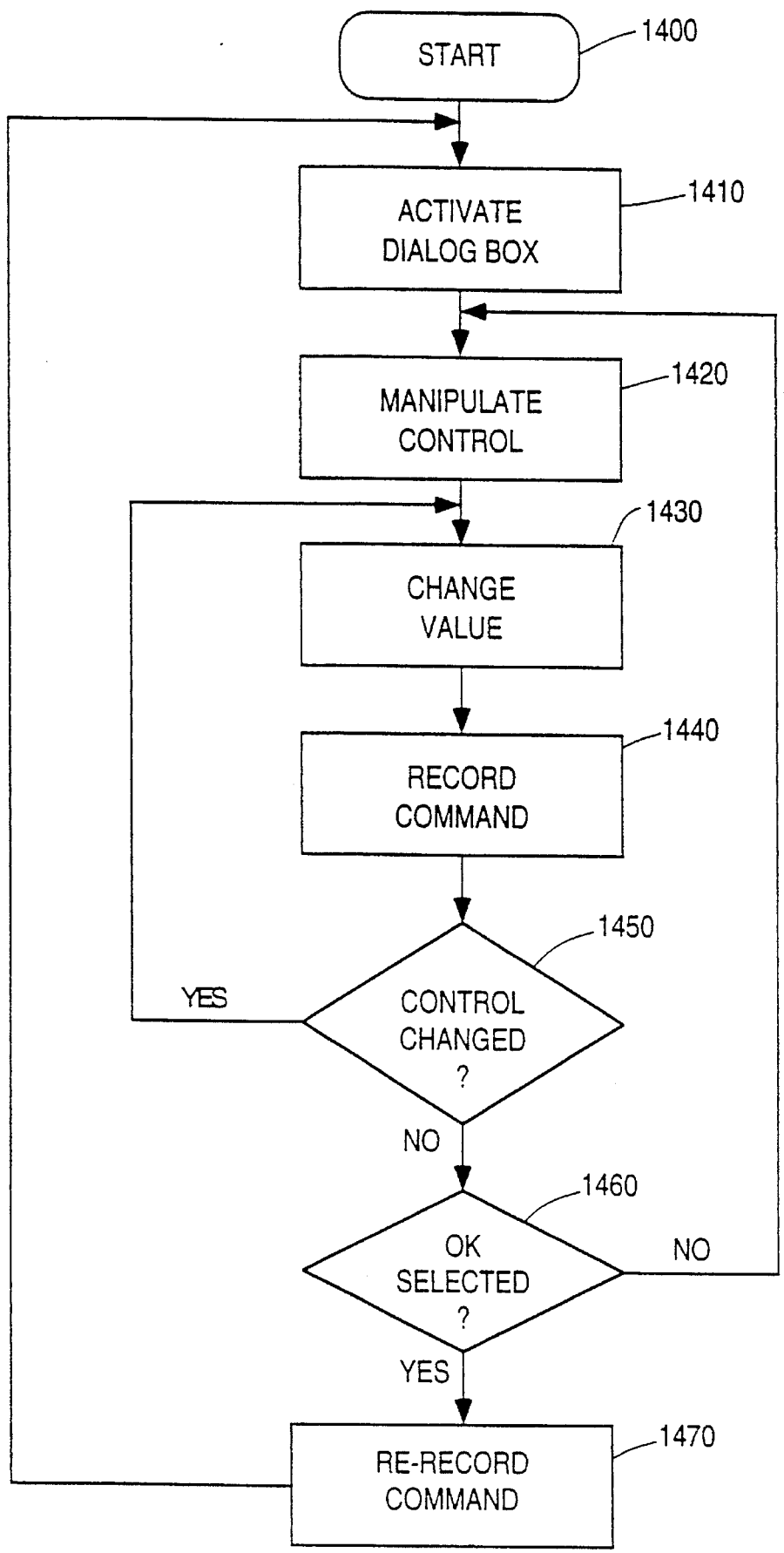
FIG. 14 illustrates the detailed logic of atomic execution in accordance with the subject invention.

The detailed logic of the atomic execution is set forth in the flowchart presented in FIG. 14. Processing commences at terminal 1400 where control is immediately passed to function block 1410 where a dialog box is activated. When the dialog box is activated, a mark is placed on the undo stack. The undo stack is a list of all commands the user has executed. When undo is pressed, the command on the top of the stack is undone. If not immediately redone, it is thrown away. Then, at function block 1410, a user manipulation of a control is detected. The manipulation of a control changes the command's data value, as appropriate as set forth in function block 1430, and executes the control. For example, a checkbox toggles the command's fChecked field between 0 and 1. Finally, the command is recorded on the undo stack so it can be subsequently undone as shown in function block 1440.

As a user subsequently manipulates each control in the dialog box, as detected in decision block 1450, then control passes to function block 1430. However, if a user presses OK as detected in decision block 1460, then control passes to function block 1420. Finally, when each control in the dialog box is set to the user's satisfaction, the user presses the OK button. All of the commands executed since the mark was placed on the undo stack in function block 1440 are collected together into a single command group and placed back onto the undo stack as depicted in function block 1470. A command group is a command that collects many commands together. When executed, undone, or redone, the command group executes, undoes, or redoes each command in sequence. The command group is then placed back onto the undo stack where it can be undone or redone as a single atomic operation.

Delayed Command Execution in Dialog Boxes

The object with which users interact to manipulate other objects or data is called a control. Example controls are menus, buttons, check boxes, and radio buttons. Each control contains a command, which implements an end-user action. Commands operate on data that is specified by a selection object. As the user manipulates the control it sets parameters in the command and causes it to be executed, thus changing the data value. Delaying changing of data until the user performs another action is one aspect of the subject invention. For example, controls in a dialog box may not want to change any data values until the user presses the OK button.

When a control is created a command must be specified. The control makes a copy of this command and stores it in field fCommand. If the command supplies any data values, a pointer to appropriate Get and Set methods of the command must also be specified. The control stores these method pointers in fields fGetMethod and fSetMethod, respectively. The data that is modified by a command is specified by a selection object. Normally, this selection object specifies real model data. Instead, a selection object that specifies the data value within the command of the OK button.

When a user manipulates the control, the control's command is executed and a data value within the command of the OK button is changed. As the user manipulates each control in the dialog box, the control's command is executed and a data value within the command of the OK button is changed. Thus, when a user presses the OK button, the command in the OK button updates the real model data to match the data values contained within itself as manipulated by the control's commands. This processing is repeated until control processing is completed.

Labels

Labels are graphical objects that contain a graphic or text string. They are used to identify windows, menus, buttons, and other controls. Labels are able to alter their appearance according to the state of their container. They are drawn on a medium-gray background and appear naturally only when no special state must be indicated. Labels modify their appearance when inactive, disabled, or selected.

Inactive

Window titles are set to be inactive when the window is not front-most. Similarly, control labels are set to be inactive when the control is not in the front-most window or other container. Graphic labels are blended with 55% white when inactive, in order to appear dimmed. For text labels, the inactive paint is derived from the natural paint by manipulating the saturation component of the HSV color model. The saturation is multiplied by 0.45 when inactive.

Disabled

Control labels are dimmed when the control does not apply in a particular context. Graphic labels are blended with 46% white when inactive, in order to appear dimmed. For text labels, the disabled paint is derived from the natural paint by manipulating the saturation component of the HSV color model. The saturation is multiplied by 0.54 when disabled.

Selected

Control labels are highlighted as the control is being manipulated. Graphics and text are drawn in their natural state, but on a white background, when highlighted.

Smart Control Labels

Controls use a command to determine the current state of the object or data. Following appropriate interactions with the user, the control updates the command's parameters and causes it to be executed. For example, a checkbox sets a command parameter to on or off and then executes the command to change a data value. Controls display a label to indicate its function. This label is a graphical object containing a graphic or a text string. As the control changes state, the label automatically adjusts its appearance, without requiring the developer to write additional code. These states include active/inactive, enabled/disabled, and select ed/unselected.

Figure 15:
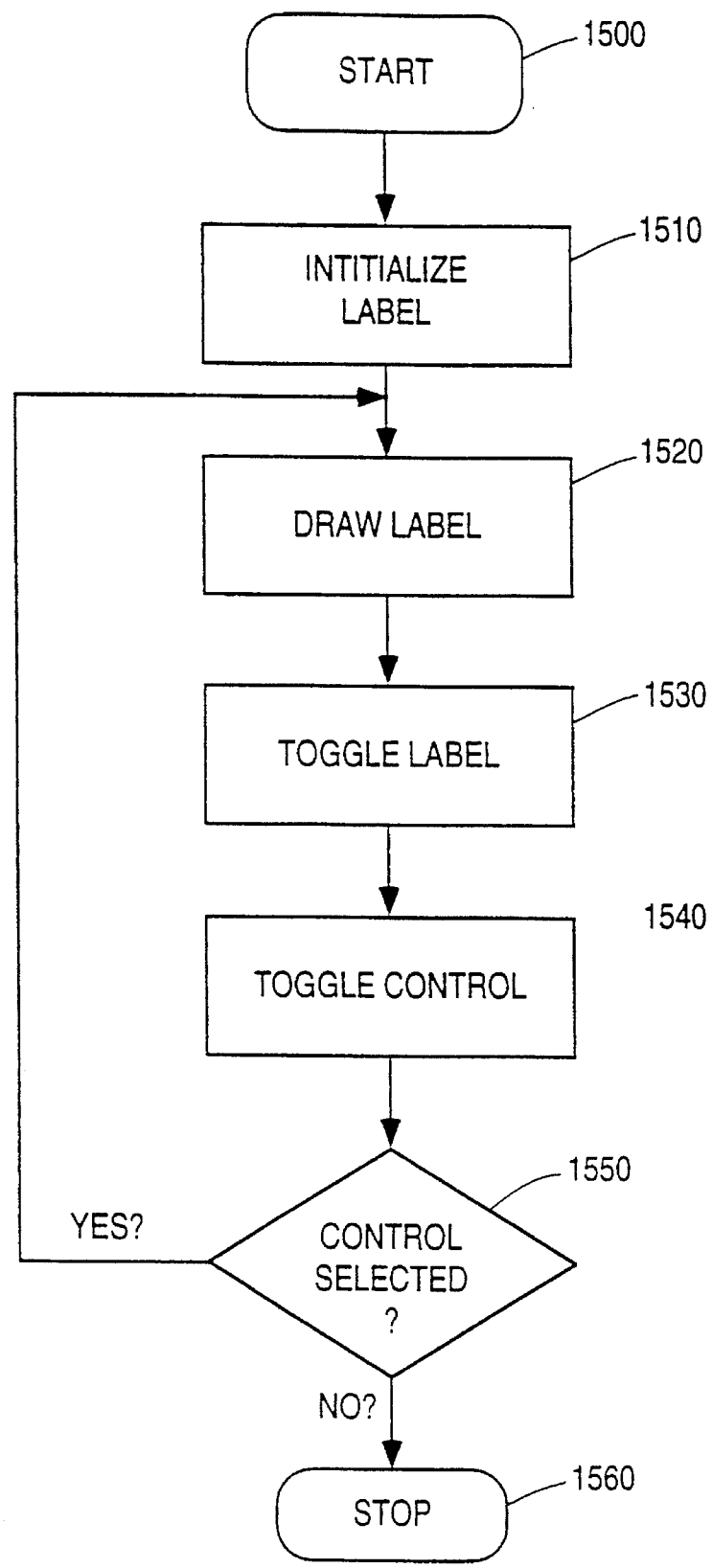
FIG. 15 sets forth the detailed logic associated with smart label processing in accordance with the subject invention.

FIG. 15 sets forth the detailed logic associated with smart label processing which commences at the start terminal 1500 where control is immediately passed to 1510 for smart label initialization. When the control is created, its label is initialized with a text string or graphic provided by its associated command. Each command provides methods called GetGraphic and GetName for this purpose. The control tells the label whether it is currently active or inactive by calling method SetActive. Similarly, the control calls method SetEnabled to tell the label whether it is enabled, and SetSelected to tell the label whether it is currently being selected by a user.

The next step in smart label processing occurs at function block 1520 when the label is drawn. When the control is activated, it calls the Draw method of its label, causing the label to appear on the screen. If inactive, the label is drawn more dimly than normal. This is done by manipulating the saturation components of the HSV color model. The saturation is multiplied by 0.45 when inactive. If disabled, the label is drawn more dimly than normal. This is done by manipulating the saturation components of the HSV color model. The saturation is multiplied by 0.54 when the label is disabled. If selected, the label on a highlighted background. Labels are normally drawn on a medium-gray background. When highlighted, labels are drawn on a white background. Otherwise, the label is drawn normally.

The next processing occurs when a label is activated/deactivated as shown in function block 1530. When the control is activated or deactivated, it tells the label by calling the SetActive method. The control then indicates its appearance needs updating by calling Invalidate with an argument indicating the portion of the screen that needs to be redrawn. Then, at function block 1540, processing occurs when a control is enabled/disabled. When the control is enabled or disabled, it tells the label by calling the SetEnabled method. The control then indicates its appearance needs updating by calling Invalidate with an argument indicating the portion of the screen that needs to be redrawn.

A test is then performed at decision block 1550 to determine if a control is selected or unselected. When the control is selected or unselected, it tells the label by calling the SetSelected method. The control then indicates its appearance needs updating by calling Invalidate with an argument indicating the portion of the screen that needs to be redrawn, and control is passed to function block 1520 for further processing.

Smart Window Labels

A title is displayed in a window in order to indicate its purpose. For example, the title for a window to edit a document is usually the name of the document. A label object is used to keep track of the title. This label is a graphical object containing a graphic or a text string. As the window changes state, the label automatically adjusts its appearance, without requiring the developer to write additional code. Windows can be either active or inactive. Smart Window label processing is flowcharted in FIG. 16 and the detailed logic is explained with reference thereto.

Figure 16:
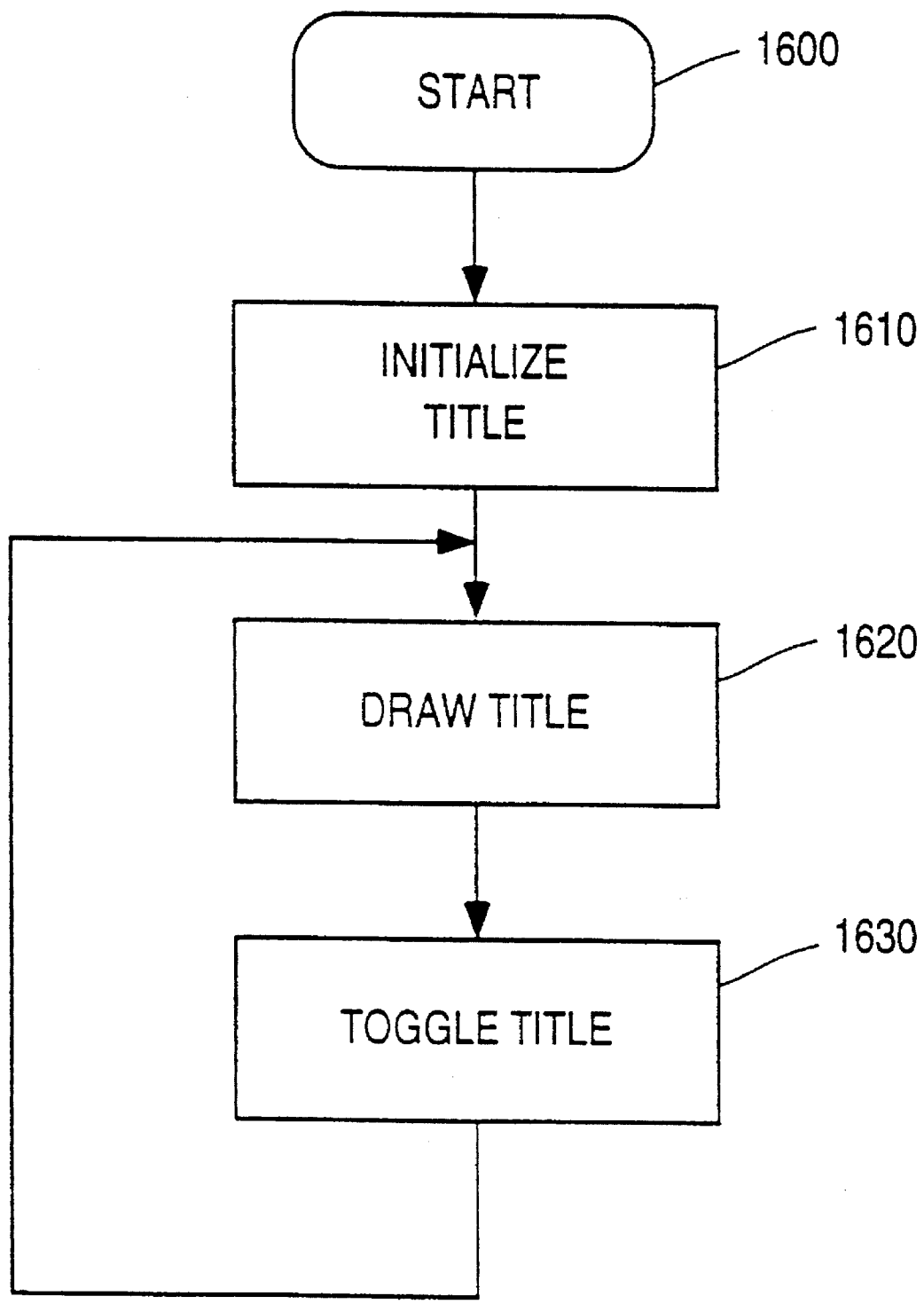
FIG. 16 presents the detailed logic of smart window label processing in accordance with the subject invention.

Processing commences in FIG. 16 at terminal 1600 where control is immediately passed to function block 1610 for the title to be initialized. A Window title is specified by a developer when a window is created. This title is stored in a TLabel object called fTitle. The control tells the title whether it is currently active or inactive by calling method SetActive. Then, the at function block 1620. When a window is drawn, it calls the Draw method of its fTitle object, causing the title to appear on the screen. If inactive, the title is drawn dimmer than normal. This is done by manipulating the saturation components of the HSV color model. The saturation is multiplied by 0.45 when inactive. Otherwise, the title is drawn normally.

The next step is processed at function block 1630 when the title is activated/deactivated. When a window is activated or deactivated, it tells its fTitle object by calling the SetActive method. The window then indicates its appearance needs updating by calling Invalidate with an argument indicating the portion of the screen that needs to be redrawn. Then, control is passed back to function block 1620 for redrawing the title to reflect its new state.

Decorations

Many of the visual aspects of user interface elements are common among many elements. Examples are shadows, borders, and labels. The individual visual features are referred to as decorations. Decorations can be combined with other graphics to form the visual appearance of specific user interface elements, such as windows and controls. The subject invention supports many different types of decorations.

Backgrounds

A decoration that is drawn behind another object is called a background. One type of background is drawn so as to appear flush with the surrounding drawing surface. It may be drawn with or without a frame. Another type of background is drawn with highlighting and shadow so it appears to be raised above the surrounding drawing surface. The final type of background is drawn with highlighting and shadow so it appears to be recessed beneath the surrounding drawing surface.

An example use of these backgrounds is a button. Normally the text or graphic that describes the button is drawn on a raised background. When pressed by the user, the text or graphic is redrawn on a recessed background. If the button is inactive, such as when another window is active, the text or graphic of the button could be drawn dimly on a flush background.

Borders

A decoration that surrounds another object or area is called a border. Example borders are frames and shadows. A frame is a border that surrounds another graphic, much like a frame encloses a painting in the real world. Like backgrounds, frames can be drawn to appear recessed below, flush with, or raised above a surrounding drawing surface. A shadow is a special type of border that adds a shadow around an object to make it appear as if it floats above the surrounding surface.

Decoration Colors

Many of the visual aspects of user interface elements are common among many elements. Examples are shadows, borders, and labels. Each of these individual visual features are referred to as a decoration. Decorations can be combined with other graphics to form the visual appearance of specific user interface elements, such as windows and controls. Some decorations use highlighting and shadows to appear as if they are above or below the surrounding drawing surface. Decorations are able to derive automatically these highlighting and shadow paints.

Fill Paint

The fill paint represents the decoration's primary color. All other paints are derived from the fill paint. The fill paint is stored by the directoration in a TColor field called fFillPaint. The fill paint is normally specified by the developer when the decoration is created. However, if no color is specified, a medium gray is selected.

Frame Paint

The frame paint is used to draw a line around the decoration to provide visual contrast. The frame paint is stored by the decoration in a TColor field called fFramePaint. The frame paint may be specified by the developer when the decoration is created. However, if no frame paint is specified, it is computed automatically from the fill paint. This is accomplished by manipulating the saturation and value components of the HSV color model. The saturation is multiplied by four, with a maximum value of 1. The value is divided by four.

Highlight Paint

The highlight paint is used to draw lines where light would hit the object if it were an actual three-dimensional object. The highlight paint is stored by the decoration in a TColor field called fHighlightPaint. The highlight paint may be specified by the developer when the decoration is created. However, if no highlight paint is specified, it is computed automatically from the fill paint. This is o accomplished by manipulating the saturation and value components of the HSV color model. The saturation is multiplied by 0.8. The value is multiplied by 1.25, with a maximum value of 1.

Shadow Paint

The shadow paint can be used to draw lines where the object would be shaded if it were an actual three-dimensional object. The shadow paint is stored by the decoration in a TColor field called fShadowPaint. The shadow paint may be specified by the developer when the decoration is created. However, if no shadow paint is specified, it is computed automatically from the fill paint. This is accomplished by manipulating the saturation and value components of the HSV color model. The saturation is multiplied by 2 with a maximum value of 1. The value is divided by 2.

Separating Input Syntax From Semantics

A graphical user interface is manipulated by moving a mouse, clicking on objects to select them, dragging objects to move or copy then, and double-clicking to open them. These operations are called direct manipulations, or interactions. The sequence of events corresponding to a user pressing, moving, and releasing a mouse is called an input syntax. Certain sequences of events are used to indicate particular actions, called semantic operations.

Figure 17:
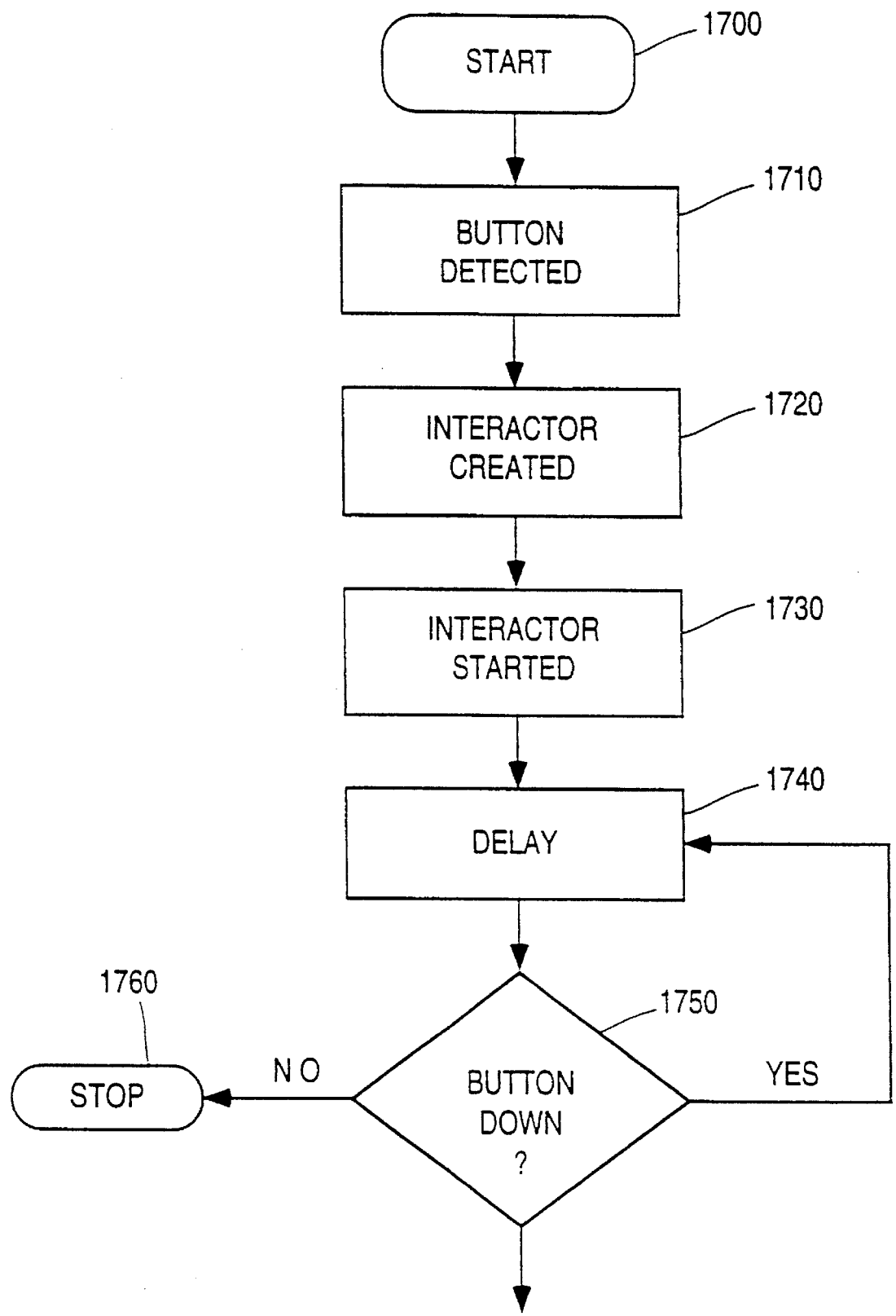
FIG. 17 illustrates how objects are created and how the objects communicate with each other during a typical interaction with an object that can be moved and selected in accordance with the subject invention.

The separation of the code that understands the input syntax from the code that implements semantic operations is the subject of this patent. This processing is embodied in objects called Interacts and Intractable, respectively. FIG. 17 illustrates how these objects are created and how the objects communicate with each other during a typical interaction with an object that can be moved and selected.

Processing commences at terminal 1700 where control is passed immediately to function block 1710 to determine if the mouse button has been pressed. An event is sent to the object responsible for the portion of the screen at the location where the mouse button was pressed. This object is called a View. Then, at function block 1720 the Interactor is created to parse the input syntax. This is done by calling the CreateInteractor method of the view. When the Interactor is created, pointers to objects that implement possible user actions are passed as parameters.

For the purposes of this discussion, assume the user pressed the mouse button down on an object that can be selected and moved. In this case, an object that implements selection and an object that implements movement for the target object are passed as parameters to the Interactor. The initial View could implement both of these behaviors, or they could be implemented by one or two separate objects. The object or objects are referred to collectively as the Interactable.

The Interactor is started at function block 1730. This processing returns the Interactor to the View and commences processing of the Interactor. This is accomplished by calling the Interactor's Start method and passing the initial mouse event as a parameter. The Start method saves the initial mouse event in field fInitialEvent. Since only one mouse event has been processed thus far, the only action possible is selecting. The Interactor enters select mode by setting variable fInteractionType to constant kSelect. It asks the Interactable to begin the selection operation by calling its SelectBegin method.

Then, the Interactor waits for a short time to pass as shown in function block 1740. A new mouse event is sent to the Interactor when the time is up which indicates the current state of the mouse. Then, if the system detects that the mouse is still down at decision block 1750, control is passed to function block 1740. Otherwise, control is passed to terminal 1760. If the mouse button is still down, the interactor makes sure it is still in the correct state and asks the Interactable to implement the correct operation. The Interactor is Selecting if fInteractionType is kSelecting. It is Moving if the fInteractionType is kMoving.

If selecting, the Interactor compares the current mouse location with the initial mouse location. The current mouse location is obtained by calling the GetCurrentLocation method. The initial mouse location is obtained by calling the GetInitialLocation method. If the two are the same or differ by only a small amount, the user is still selecting the object. The Interactor then asks the Interactable to continue the selection operation by calling its SelectRepeat method. However, if the two points differ beyond a predetermined threshold, the user has begun moving the object. In this case, the Interactor asks the Interactable to terminate the selection operation by calling its SelectEnd method. It then asks the Interactable to begin the move operation by callings its MoveBegin method. In each case, the current mouse location is passed as an argument. If Moving, the Interactor asks the Interactable to continue the move operation by calling its MoveRepeat method. It passes the current mouse location as an argument.

When the user releases the mouse button, it signals the end of the current operation. If Selecting, the Interactor asks the Interactable to terminate the selection operation by calling its SelectEnd method. If moving, the Interactors asks the Interactable to terminate the move operation by calling its MoveEnd method.

Localized Presentations

Localization is the process of updating an application to conform to unique requirements of a specific locale. It may involve language translation, graphic substitution, and interface element reorientation. For example, the text used in labels, titles, and messages depends upon the selected language. Its direction and orientation may affect the placement and orientation of a menu, menubar, title, scrollbar, or toolbar. Similarly, the selection of icons and other graphical symbols may be culturally dependent. Unfortunately, having many localized versions of user interface elements in memory is very expensive. Instead, localized versions of user interface elements are kept on disk until required in memory.

Further, it is very error-prone and expensive to keep track of all of the user interface elements and decide which version to use. Instead, when a user interface element is required, the appropriate one is selected automatically by the system, according to the current language and other cultural parameters, and read into memory.

Figure 19:
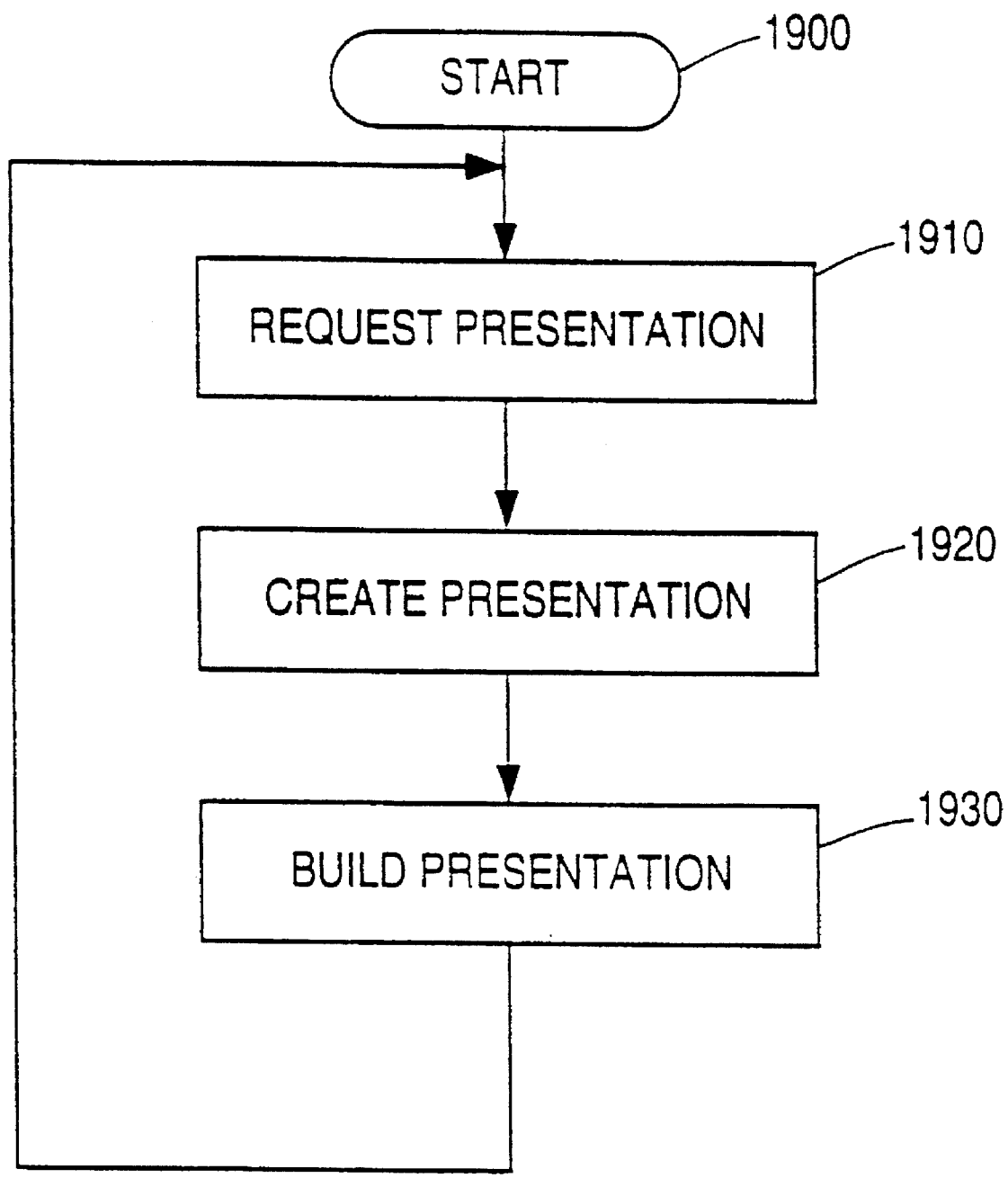
FIG. 19 presents a flowchart illustrating the detailed logic associated with selecting the proper user interface element in accordance with the subject invention.

Once localized, user interface elements are stored in a disk dictionary. A disk dictionary is an object that, when given a key, returns a value after reading it in from disk. This disk dictionary is managed by an object called an archive. An archive is responsible for putting together the individual user interface elements that make up a particular presentation. The process of selecting the proper user interface element is presented in FIG. 19.

Processing commences at terminal 1900 and immediately passes to function block 1910 when a user requests a presentation. A TOpenPresentation Command is sent to the data model, indicating that the user wants to view or edit this data. A command is sent to the data model to indicate that the user wants to view or edit the data. This command is called a TOpenPresentationCommand. A presentation is a set of user interface elements that, together, allow the user to view or edit some data. Presentations are stored across sessions in User Interface object, thus maintaining continuity for the user. User interface elements are stored on disk until needed in memory. They may be required as part of a data presentation the user has requested, or they may be needed for translation or another localization process. Each user interface element contains an ID which uniquely references that element. However, all localized versions of the same user interface element share a single ID.

In order to differentiate the localized versions, the particular language, writing direction, and other cultural parameters are stored with each localized user interface element. Together, these parameters are referred to as the locale. All of the user interface elements are stored in a file. This file is organized like a dictionary, with one or more key/value pairs. The key is an object which combines the ID and the locale. The value is the user interface element itself.

A new presentation must be created next at function block 1920. If an appropriate presentation does not already exist, a new one must be created from a template by the user interface Archive. A new presentation is created from a template stored in the archive by calling its CreatePresentation method. A presentation type is passed to this method as a parameter. This type includes such information as the type of data to be displayed, whether it is to be in its own window or part of another presentation, and so on. Finally, at function block 1930, an Archive builds the presentation, selecting user interface elements according to locale. If the Archive is able to build a presentation of the specified type, it collects together each user interface element that makes up the presentation and returns this to the user interface object.

For each presentation the archive is able to make, it has a list of user interface element IDs that together make up the presentation. The user interface elements are o stored on disk maintained by a disk dictionary object called. Given a key, the disk dictionary will return the corresponding user interface element. The user interface element ID makes up the primary component of this key. A secondary component of the key is the desired locale. A locale is an object that specifies the natural language and other cultural attributes of the user. The locale obtained automatically by the Archive from a Preferences Server. This server contains all of the individual preferences associated with the user.

The locale, as obtained from the preferences server, is combined with the ID into a single object called a TUserInterfaceElementKey. This key passed as a parameter to the GetValue method of the disk dictionary. If a user interface element with a matching ID and locale is found, it is returned and included as part of the presentation. Otherwise, the locale parameter must be omitted from the key, or another locale must be specified until an appropriate user interface element is found.

Interaction Framework System

Users of an object oriented operating system's graphical user interface often move a mouse, click on objects to select them, drag objects to move or copy then, and double-click to open an object. These operations are called direct manipulations, or interactions. The sequence of events corresponding to a user pressing, moving, and releasing the mouse is called the input syntax. Certain sequences of events are used to indicate particular actions, called semantic operations. This invention discloses the method and apparatus for translating input syntax into semantic operations for an object that supports Select, Peek, Move, AutoScroll, and Drag/Drop (Copy).

The invention detects a mouse button depression and then employs the following logic:

(a) If an Option key was depressed when the user pressed the mouse button, the system enters drag mode by setting variable fInteractionType to constant kDrag. The system then commences a drag operation using the selected object as the target of the operation; or (b) if the Option key was not depressed, then the system enters selection mode by setting variable fInteractionType to constant kSelect. Then, the select operation is commenced.

If a user already had the mouse button depresses and continues to hold the mouse button down, then the following logic is engaged. If the system is in select mode, then the system first determines whether the user has moved the mouse beyond a certain threshold, called the move threshold. This is done by comparing the initial mouse location, returned by the GetInitialLocation method, with the current mouse location, returned by the GetCurrentLocation method. If the mouse has moved beyond the move threshold, the system ends select mode and enters move mode. It does this by setting variable fInteractionType to constant kMove. The system then queries the object to terminate the select operation by calling its SelectEnd method. The system then initiates a move operation by calling its MoveBegin method.

Otherwise, if the mouse has not moved, the system checks how long the mouse has been down. It does this by comparing the initial mouse down time, returned by the GetInitialTime method, with the current time, returned by the GetCurrentTime method. If the mouse has been down beyond a certain threshold, called the peek threshold, the system ends select mode and enters peek mode. It does this by setting variable fInteractionType to constant kPeek. It asks the object to end the select operation by callings its SelectEnd method, and begins a peek operation by calling its PeekBegin method. Otherwise, if the mouse has not moved, or it has not been down beyond the peek threshold, the system continues the select operation by calling the object's SelectRepeat method. If the system detects that a user is in Move mode, the system first determines whether the user has moved the mouse within the window, on the border of the window, or outside the window. It does this by comparing the current mouse location, returned by the GetCurrentLocationMethod, with the bounds of the object's container, returned by GetContainerBounds.

If the mouse is still within the bounds of the window, the system continues the move operation by calling the object's MoveRepeat method. If the mouse is on the border of the window, this indicates an AutoScroll operation. The system asks the object's container to scroll in the direction indicated by the mouse location. This is done by calling the container's AutoScroll method and passing the current mouse location as a parameter. Once complete, the system continues the move operation by calling the object's MoveRepeat method.

If the mouse has moved outside the window, the system ends move mode and enters drag mode. It does this by setting variable fInteractionType to constant kDrag. It asks the object to end the move operation by calling its MoveEnd method. It asks the object to begin the drag operation by calling its DragBegin method. If the system is in drag mode, the system continues the drag operation by calling the object's DragRepeat method. If the system is in peek mode, the system first determines whether the user has moved the mouse beyond a certain threshold, called the move threshold. This is done by comparing the initial mouse location, returned by the GetInitialLocation method, with the current mouse location, returned by the GetCurrentLocation method.

If the mouse has moved beyond the move threshold, the system ends peek mode and enters move mode. It does this by setting variable fInteractionType to constant kMove. It asks the object to end the peek operation by calling its PeekEnd method. It asks the object to begin the move operation by calling its MoveBegin method. Otherwise, if the mouse has not moved, the system continues the peek operation by calling the object's PeekRepeat method.

If the system detects that a user releases the mouse button, then if the system is in select mode, the system ends select mode. It does this by setting variable fInteractionType to constant kNone. The system queries the object to end the select operation by calling its SelectEnd method. If the system is in move mode, the system ends move mode. It does this by setting variable fInteractionType to constant kNone. Then, the system queries the object to end the move operation by calling its MoveEnd method and ends drag mode by setting variable fInteractionType to constant kNone. It asks the object to end the drag operation by calling its DragEnd method. If the system is in peek mode, the system ends peek mode. It does this by setting variable fInteractionType to constant kNone. It asks the object to end the peek operation by calling its PeekEnd method.

Accordingly, it is a primary objective of the present invention to provide an innovative hardware and software system which enables the contents of a window to update dynamically as a user moves a scrollbar thumb. The system detects when a user presses down on a scrollbar thumb. When the user presses down on the scrollbar thumb, the system begins initiation of a scroll command to change the portion of the data that is exposed in the window. A command is an object that implements an end-user action, such as scrolling. A scroll command has one parameter, the position to which the content view should be scrolled. The system sets this position to the current scroll position. This is accomplished by calling the command's SetScrollPosition and setting the scroll to position to the value returned by the scrollbar's method Get ScrollPosition.

When a user moves the mouse within the scrollbar, the system continues the execution of the scroll command to dynamically change the portion of the data exposed in the window. The system sets the scroll position of the command to the new scroll position. This is accomplished by calling the command's SetScrollPosition and setting the value equal to the value returned by the scrollbar's method GetScrollPosition. The execution of the command is then repeated by calling its DoRepeat method. This causes the content view to scroll to the new position. This processing is continued while a user continues to hold the mouse button down.

When a user releases the mouse button, the system ends the execution of the scroll command to dynamically change the portion of the data exposed in the window. The system sets the scroll position of the command to the final scroll position. This processing is accomplished by calling the command's SetScrollPosition and setting it equal to the value returned by the scrollbar's method GetScrollPosition.

Figure 20:
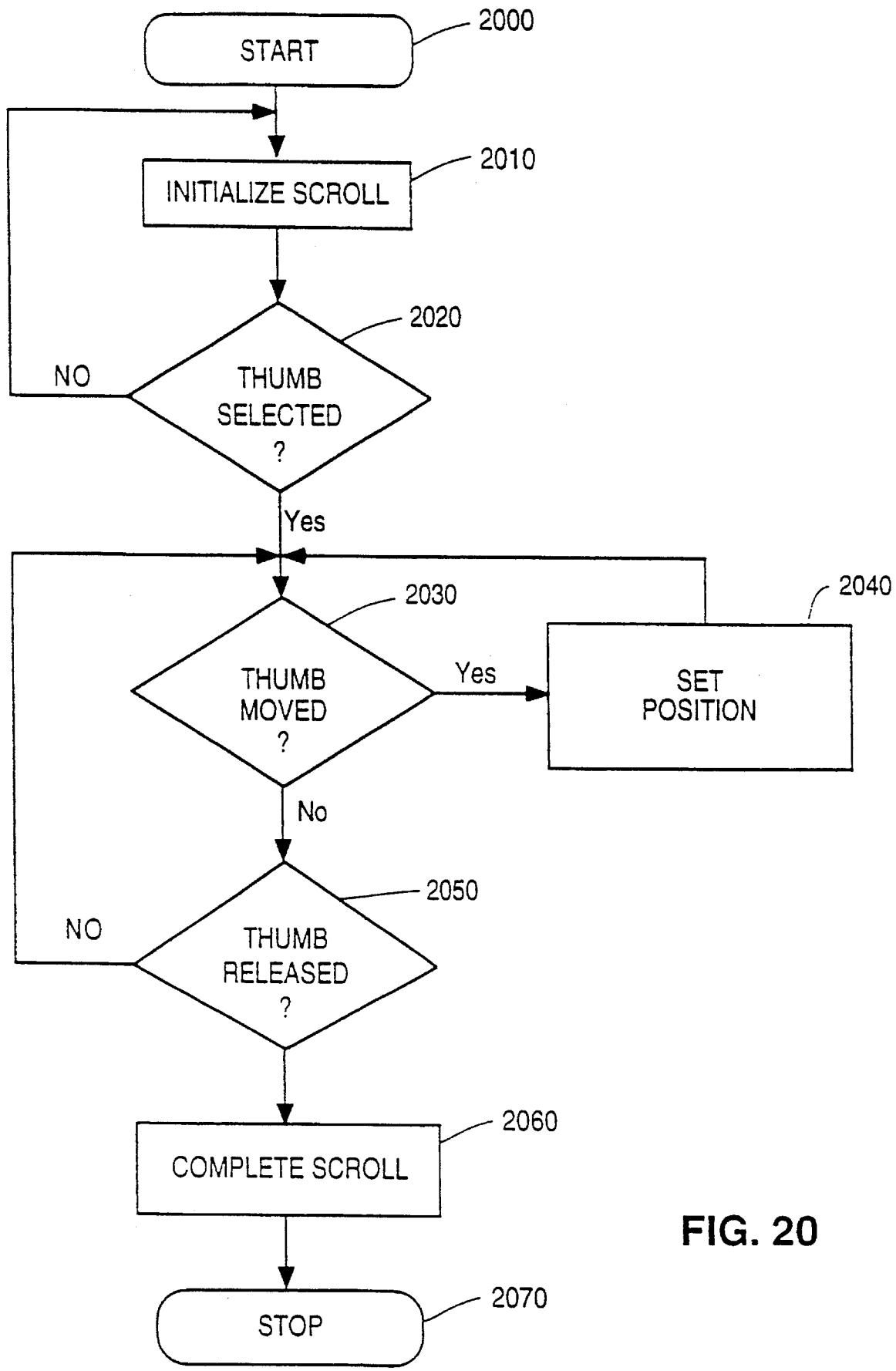
FIG. 20 is a flowchart illustrating the detailed logic associated with scrolling in accordance with the subject invention.
Figure 21A:
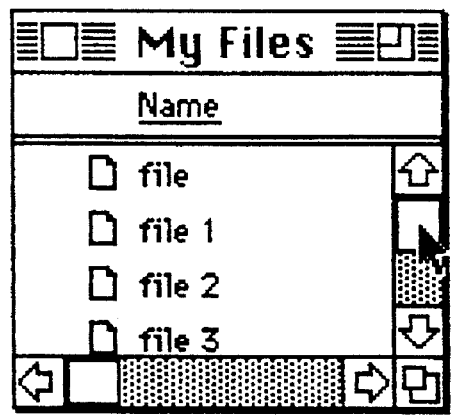
FIGS. 21A, 21B and 21C illustrate window scrolling in accordance with the subject invention.

FIG. 20 is a flowchart illustrating the detailed logic associated with scrolling in accordance with the subject invention. Processing commences at terminal block 2000 and immediately passes to function block 2010 where the current scroll position is initialized based on the current cursor location. Then, at decision block 2020, a test is performed to detect if the scrollbar thumb has been selected. An example of a scrollbar thumb is shown in FIG. 21A at label 2110. If the scrollbar thumb has been selected, then control passes to decision block 2030 to determine if the scrollbar thumb has been moved. If so, then the scroll position is set to the new position of the scrollbar thumb and the display is reformatted to reflect the immediate scroll operation and displayed for the user. If the scrollbar thumb has not moved, another test is performed at decision block 2050 to determine if the scrollbar thumb has been released. If not, then control is returned to decision block 2030. If the scrollbar thumb has been released, then control passes to function block 2060 to end the scroll operation and return the system to a non-scroll operational status and processing is completed at terminal 2070.

Figure 21B:
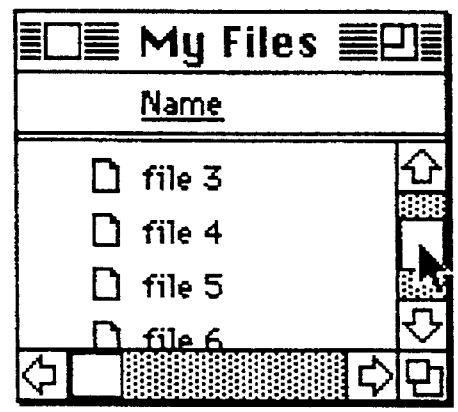
Figure 21C:
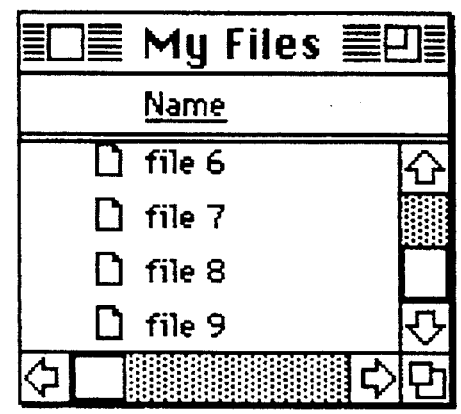

FIGS. 21A, 21B and 21C illustrate window scrolling in accordance with the subject invention. In FIG. 21A, the scrollbar thumb 2110 is located at the top of the window 2112. FIG. 21B shows the scrollbar thumb 2120 moved to the middle of the window and the window's contents 2122 updated accordingly. FIG. 21C shows the scrollbar thumb 2140 moved to the bottom of the window and the bottom most portion of the window 2142 displayed.

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. In a computer system with a processor, a memory, an object-oriented operating system stored in the memory and a display, an apparatus for providing an object oriented application interface between a pointing device having a pointer graphic and a user-operable button, a keyboard having an option key and an object-oriented application program, the apparatus comprising:

(a) interactable class information stored in the memory as part of the object-oriented operating system, the interactable class information including graphic data representing a display icon and a plurality of methods for drawing and manipulating the display icon on the display;

(b) an interactable object instantiated from the interactable class information and incorporated into the application program, the object having a display icon visible on the display, and a plurality of methods for manipulating the display icon on the display;

(c) means responsive to a depression of the user-operable button for generating a device event signal;

(d) means responsive to a physical position of the pointer graphic on the display device for generating device position signals;

(e) means responsive to a depression of the option key for generating an option key signal; and (f) an interactor object responsive to the device event signal, to the device position signals and to the option key signal for calling a first predetermined one of the manipulating methods to move the display icon when the option key is depressed and the user-operable button is depressed.

2. An apparatus for providing an object oriented application interface as recited in claim 1 wherein the display icon has a visual appearance and the interactor object is responsive to the device event signal and to the device position for calling a second predetermined one of the manipulating methods to change the display icon visual appearance when the option key is not depressed and the user-operable button is depressed.

3. In a computer system with a processor, a memory, an object-oriented operating system stored in the memory and a display, an apparatus for providing an object oriented application interface between a pointing device having a pointer graphic and a user-operable button, and an object-oriented application program, the apparatus comprising:

(a) interactable class information stored in the memory as part of the object-oriented operating system, the interactable class information including graphic data representing a display icon and a plurality of methods for drawing and manipulating the display icon on the display;

(b) an interactable object instantiated from the interactable class information and incorporated into the application program, the object having a display icon visible on the display, a plurality of methods for manipulating the display icon on the display;

(c) means responsive to a depression of the user-operable button for generating a device event signal;

(d) means responsive to a physical position of the pointer graphic on the display device for generating device position signals;

(e) an interactor object comprising:
      timing means responsive to the device event signal for detecting when the user-operable button is depressed for a predetermined time interval;
      storage means for storing a threshold value;
      means responsive to the device position signals and to the threshold value for determining if the pointing device is moved beyond the threshold value; and
      means responsive to the device event signal and to the device position signals for calling a first predetermined one of the manipulating methods to move the display icon when the pointing device is moved beyond the threshold value.

4. In a computer system with a processor, a memory, an object-oriented operating system stored in the memory and a display, a method for providing an object oriented application interface between a pointing device having a pointer graphic and a user-operable button, a keyboard having an option key and an object-oriented application program, the method comprising the steps of:

(a) storing interactable class information in the memory as part of the object-oriented operating system, the interactable class information including graphic data representing a display icon and a plurality of methods for drawing and manipulating the display icon on the display;

(b) creating an interactable object from the interactable class information and incorporated into the application program, the object having a display icon visible on the display, a plurality of methods for manipulating the display icon on the display;

(c) generating a device event signal in response to a depression of the user-operable button;

(d) generating device position signals in response to a physical position of the pointer graphic on the display device;

(e) generating an option key signal in response to a depression of the option key; and (f) creating an interactor object which is responsive to the device event signal to the device position signals and to the option key signal for calling a first predetermined one of the manipulating methods to move the display icon when the option key is depressed and the user-operable button is depressed.

5. A method for providing an object oriented application interface, as recited in claim 4, wherein the display icon has a visual appearance and step (f) comprises the step of:

calling a second predetermined one of the manipulating methods to change the display icon visual appearance when the option key is not depressed and the user-operable button is depressed.

6. In a computer system with a processor, a memory, an object-oriented operating system stored in the memory and a display, a method for providing an object oriented application interface between a pointing device having a pointer graphic and a user-operable button, and an object-oriented application program, the method comprising the steps of:

(a) storing interactable class information in the memory as part of the object-oriented operating system, the interactable class information including a graphic data representing a display icon and a plurality of methods for drawing and manipulating the display icon on the display;

(b) creating an interactable object from the interactable class information and incorporated into the application program, the object having a display icon visible on the display, a plurality of methods for manipulating the display icon on the display;

(c) generating a device event signal in response to a depression of the user-operable button;

(d) generating device position signals in response to a physical position of the pointer graphic on the display device;

(e) creating an interactor object which performs the steps of:
   detecting when the user-operable button is depressed for a predetermined time interval;
   storing a threshold value;
   determining if the pointing device is moved beyond the threshold value; and
   calling a first predetermined one of the manipulating methods to move the display icon when the pointing device is moved beyond the threshold value.

7. In a computer system with a processor, a memory, an object-oriented operating system stored in the memory and a display, an apparatus for providing an object oriented application interface between a pointing device having a pointer graphic and a user-operable button and an object-oriented application program, the apparatus comprising:

(a) storing interactable class information in the memory as part of the object-oriented operating system, the interactable class information including graphic data representing a display icon and a plurality of methods for drawing and manipulating the display icon on the display;

(b) an interactable object from the interactable class information, the interactable object becoming part of the application program, the object having means for displaying both a display icon and a peek display on the display, a plurality of methods for manipulating the display icon on the display;

(c) means responsive to a depression of the user-operable button for generating a device event signal;

(d) means responsive to a physical position of the pointer graphic on the display device for generating device position signals;

(e) an interactor object comprising:
   timing means responsive to the device event signal for detecting when the user-operable button is depressed for a predetermined time interval;
   storage means for storing a peek threshold value;
   means responsive to the predetermined time interval and to the threshold value for generating a peek message if the user-operable button has been depressed longer than the peek threshold value; and
   means responsive to the peek message for calling a first predetermined one of the manipulating methods to change the display from the display icon to the peek display.

8. An apparatus for providing an object oriented application interface as recited in claim 7 wherein the display has a display area and the apparatus further comprises:

a view object comprising:
   means cooperating with the interactable object for determining a display location in the display area where the display icon is displayed;
   means for determining boundaries of a selectable area within the display area;
   means responsive to the display location and to the boundaries for generating a position signal when the display icon is located within the boundaries; and
   wherein the interactor object further comprises:
      means responsive to the device event signal, the position signal and to the device position signals for calling a second predetermined one of the manipulating methods to move the display icon when the pointing device is moved and the display icon is located within the boundaries.

9. An apparatus for providing an object oriented application interface as recited in claim 7 wherein the display has a display area and the apparatus further comprises:

a view object comprising:
   means cooperating with the interactable object for determining a display location in the display area where the display icon is displayed;
   means for determining boundaries of a selectable area within the display area;
   means responsive to the display location and to the boundaries for generating a position signal when the display icon is located within the boundaries; and
   wherein the interactor object further comprises:
      means responsive to the device event signal, the position signal and to the device position signals for calling a second predetermined one of the manipulating methods to move the display icon when the pointing device is moved and the display icon is located within the boundaries; and
      means responsive to the device event signal, the position signal and to the device position signals for calling a third predetermined one of the manipulating methods for halting the move operation if the display icon is located outside of the boundaries.

10. An apparatus for providing an object oriented application interface as recited in claim 9 further comprising means responsive to the device event signal, the position signal and to the device position signals for calling a fourth predetermined one of the manipulating methods for continuing the move operation if the display icon is located inside of the boundaries.

11. An apparatus for providing an object oriented application interface as recited in claim 7 wherein the display has a display area and the apparatus further comprises:

a view object comprising:
   means cooperating with the interactable object for determining a display location in the display area where the display icon is displayed;
   means for determining boundaries of a selectable area within the display area;
   means responsive to the display location and to the boundaries for generating a position signal when the display icon is located within the boundaries; and
   wherein the interactor object further comprises:
      means responsive to the device event signal, the position signal and to the device position signals for calling a second predetermined one of the manipulating methods to move the display icon when the pointing device is moved and the display icon is located within the boundaries; and
      means responsive to the device event signal, the position signal and to the device position signals for calling a third predetermined one of the manipulating methods for performing a scroll operation if the display icon is located on one of the boundaries.

12. An apparatus for providing an object oriented application interface as recited in claim 11 further comprising means responsive to the device event signal, the position signal and to the device position signals for calling a third predetermined one of the manipulating methods for continuing the scroll operation if the display icon is located within the boundaries.

13. In a computer system with a processor, a memory, an object-oriented operating system stored in the memory and a display, a method for providing an object oriented application interface between a pointing device having a pointer graphic and a user-operable button and an object-oriented application program, the method comprising the steps of:

(a) storing interactable class information in the memory as part of the object-oriented operating system, the interactable class information including graphic data representing a display icon and a plurality of methods for drawing and manipulating the display icon on the display;

(b) creating an interactable object from the interactable class information, the interactable object becoming part of the application program, the object having means for displaying both a display icon and a peek display on the display and a plurality of methods for manipulating the display icon on the display;

(c) generating a device event signal in response to a depression of the user-operable button;

(d) generating device position signals in response to a physical position of the pointer graphic on the display device;

(e) creating an interactor object which performs the steps of:
detecting when the user-operable button is depressed for a predetermined time interval;
storing a peek threshold value;
generating a peek message if the user-operable button has been depressed longer than the peek threshold value; and
calling a first predetermined one of the manipulating methods to change the display from the display icon to the peek display.

14. A method for providing an object oriented application interface as recited in claim 13 wherein the display has a display area and the method further comprises the steps of:

(f) creating a view object which performs the steps of:
determining a display location in the display area where the display icon is displayed;
determining boundaries of a selectable area within the display area;
generating a position signal when the display icon is located within the boundaries; and
wherein the interactor object further performs the step of calling a second predetermined one of the manipulating methods to move the display icon when the pointing device is moved and the display icon is located within the boundaries.

15. A method for providing an object oriented application interface as recited in claim 13 wherein the display has a display area and the method further comprises the steps of:

(g) creating a view object which performs the steps of:
determining a display location in the display area where the display icon is displayed;
determining boundaries of a selectable area within the display area;
generating a position signal when the display icon is located within the boundaries; and
wherein the interactor object further performs the steps of:
calling a second predetermined one of the manipulating methods to move the display icon when the pointing device is moved and the display icon is located within the boundaries; and
calling a third predetermined one of the manipulating methods for halting the move operation if the display icon is located outside of the boundaries.

16. A method for providing an object oriented application interface as recited in claim 15 wherein the interactor object further performs the step of:
calling a fourth predetermined one of the manipulating methods for continuing the move operation if the display icon is located inside of the boundaries.

17. A method for providing an object oriented application interface as recited in claim 13 wherein the display has a display area and the method further comprises the steps of:

(h) creating a view object which performs the steps of:
determining a display location in the display area where the display icon is displayed;
determining boundaries of a selectable area within the display area;
generating a position signal when the display icon is located within the boundaries; and
wherein the interactor object further performs the steps of:
calling a second predetermined one of the manipulating methods to move the display icon when the pointing device is moved and the display icon is located within the boundaries; and
calling a third predetermined one of the manipulating methods for performing a scroll operation if the display icon is located on one of the boundaries.

18. A method for providing an object oriented application interface as recited in claim 17 wherein the interactor object further performs the step of:
calling a third predetermined one of the manipulating methods for continuing the scroll operation if the display icon is located within the boundaries.

19. A computer program product for use in a computer system having a memory, an object-oriented operating system stored in the memory, an application program stored in the memory, a display, a pointing device having a pointer graphic, which generates device position signals in response to a physical position of the pointer graphic on the display and which has a user-operable button which generates a device event signal when pressed and a keyboard having an option key which generates an option key signal when depressed, the computer program product comprising:

a computer usable medium have computer readable program code including:
(a) interactable class information including graphic data representing a display icon and a plurality of methods for instantiating an interactable object from the interactable class information and incorporating the interactable object into the application program and for drawing and manipulating a display icon on the display;
(b) means for storing the interactable class information in the memory as part of the object-oriented operating system;
(c) interactor class information including means for instantiating an interactor object from the interactor class information and incorporating the interactor object into the operating system, means responsive to the device event signal, to the device position signals and to the option key signal for calling a first predetermined one of the manipulating methods to move the display icon when the option key is depressed and the user-operable button is depressed; and (d) means for storing the interactor class information in the memory as part of the object-oriented operating system.

20. A computer program product according to claim 19 wherein the display icon has a visual appearance and the interactor class information includes means for calling a second predetermined one of the manipulating methods to change the display icon visual appearance when the option key is not depressed and the user-operable button is depressed.

* * * * *